United States Patent
Shimomoto et al.

(10) Patent No.: US 9,940,083 B2
(45) Date of Patent: Apr. 10, 2018

(54) INFORMATION PROCESSING SYSTEM AND METHOD TO EXECUTE A WORKFLOW PROCESSING CORRESPONDING TO AN IMAGE

(71) Applicants: Ryoh Shimomoto, Kanagawa (JP); Kyohsuke Kaminushi, Kanagawa (JP)

(72) Inventors: Ryoh Shimomoto, Kanagawa (JP); Kyohsuke Kaminushi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/285,098

(22) Filed: Oct. 4, 2016

(65) Prior Publication Data
US 2017/0102906 A1 Apr. 13, 2017

(30) Foreign Application Priority Data

Oct. 7, 2015 (JP) .................................. 2015-199675
Nov. 27, 2015 (JP) .................................. 2015-231616

(51) Int. Cl.
  *G06F 3/12* (2006.01)
  *H04N 1/00* (2006.01)
  *G06Q 10/06* (2012.01)

(52) U.S. Cl.
  CPC .......... *G06F 3/1275* (2013.01); *G06F 3/1205* (2013.01); *G06F 3/1206* (2013.01); *G06F 3/1285* (2013.01); *G06Q 10/06* (2013.01); *H04N 1/00212* (2013.01); *H04N 1/00244* (2013.01)

(58) Field of Classification Search
  CPC .......... G06K 15/1856; G06K 15/1815; H04N 1/00949; H04N 1/00228; H04N 1/0023; H04N 1/00233; H04N 1/00867; H04N 1/00212; H04N 1/32005; H04N 1/3208; H04N 1/32422; H04N 1/32745; G06F 3/13; G06F 3/1208; G06F 3/1275
  See application file for complete search history.

(56) References Cited

U.S. PATENT DOCUMENTS 8,464,167 B2 6/2013 Saund et al.
2011/0286039 A1* 11/2011 Akimoto ............ H04N 1/00204
                                                                    358/1.15

(Continued)

FOREIGN PATENT DOCUMENTS

JP 2004-029946 1/2004
JP 2005-301575 10/2005

(Continued)

*Primary Examiner* — Henok A Shiferaw
(74) *Attorney, Agent, or Firm* — Oblon, McClelland, Maier & Neustadt, L.L.P.

(57) ABSTRACT

An information processing system includes: a terminal; and a file server. The terminal includes: a first communication unit configured to receive data from the file server; a display unit configured to display the data; and an editing unit configured to add an image associated with workflow processing, to the data. The first communication unit is further configured to transmit the data to which the image is added, to the file server. The file server includes: a second communication unit configured to transmit the data to the terminal and receive the data to which the image is added, from the terminal; and an executing unit configured to execute the workflow processing associated with the image.

19 Claims, 42 Drawing Sheets

(56) References Cited

U.S. PATENT DOCUMENTS

| | | |
|---|---|---|
| 2014/0082139 A1 | 3/2014 | Shimomoto |
| 2014/0280774 A1 | 9/2014 | Kaminushi |
| 2015/0149574 A1 | 5/2015 | Shimomoto |
| 2015/0201101 A1 | 7/2015 | Kaminushi |
| 2015/0339017 A1* | 11/2015 | Watanabe ............ G06F 3/04886 715/780 |
| 2016/0056879 A1 | 2/2016 | Shimomoto |
| 2016/0081129 A1 | 3/2016 | Kaminushi |
| 2016/0094659 A1* | 3/2016 | Shimomoto ......... G06F 21/6218 709/217 |
| 2017/0134608 A1* | 5/2017 | Hayano .............. H04N 1/32315 |

FOREIGN PATENT DOCUMENTS

| | | |
|---|---|---|
| JP | 2010-129093 | 6/2010 |
| JP | 2015-127947 | 7/2015 |

\* cited by examiner

FIG.6

| SETTING OF WORKFLOW | APPLY |

WORKFLOW NAME

Workflow1

PROCESSING PERFORMED IN WORKFLOW
- ● SAVE DATA
- ○ PRINT DATA BY PRINTER
- ○ DELETE DATA AFTER CERTAIN PERIOD OF TIME
- ○ SEND DATA BY FACSIMILE

FORMAT OF SAVED DATA

PDF ▼

DESTINATION TO SAVE    ADD  DELETE

/allusers/APPROVED DOCUMENT

DESTINATION OF E-MAIL    ADD  DELETE user_a@example.com

DESTINATION OF INSTANT MESSAGE  ADD  DELETE

UserA
UserB

FIG.7

| SETTING OF WORKFLOW | APPLY |
|---|---|

WORKFLOW NAME

Workflow2

PROCESSING PERFORMED IN WORKFLOW
- ○ SAVE DATA
- ● PRINT DATA BY PRINTER
- ○ DELETE DATA AFTER CERTAIN PERIOD OF TIME
- ○ SEND DATA BY FACSIMILE

ADDRESS OF PRINTER 192.168.0.20 ▼

NUMBER OF COPIES   COLOR/MONOCHROME

1   FULL-COLOR ▼

SINGLE-SIDED/
DOUBLE-SIDED PRINTING   SHEET SIZE

SINGLE-SIDED ▼   AUTOMATIC SELECTION ▼

DESTINATION OF E-MAIL   ADD   DELETE user_a@example.com

DESTINATION OF INSTANT MESSAGE   ADD   DELETE

UserA
UserB

FIG.8

```
SETTING OF WORKFLOW                              [APPLY]

WORKFLOW NAME
[Workflow3                                              ]

PROCESSING PERFORMED IN WORKFLOW
  ○ SAVE DATA
  ○ PRINT DATA BY PRINTER
  ● DELETE DATA AFTER CERTAIN PERIOD OF TIME
  ○ SEND DATA BY FACSIMILE

FORMAT OF SAVED DATA
[PDF                                              ▼]

DESTINATION TO SAVE              [ADD] [DELETE]
[/allusers/APPROVED DOCUMENT                       ]

DELETE DATA WHEN FOLLOWING DAYS HAVE ELAPSED
[30                                                ]

DESTINATION OF E-MAIL            [ADD] [DELETE]
[user_a@example.com                                ]

DESTINATION OF INSTANT MESSAGE   [ADD] [DELETE]
[UserA
 UserB                                             ]
```

FIG.9

| SETTING OF WORKFLOW | APPLY |

WORKFLOW NAME

Workflow4

PROCESSING PERFORMED IN WORKFLOW
- ○ SAVE DATA
- ○ PRINT DATA BY PRINTER
- ○ DELETE DATA AFTER CERTAIN PERIOD OF TIME
- ● SEND DATA BY FACSIMILE

ADDRESS OF FACSIMILE 192.168.0.21 ▼

DESTINATION  [ADD] [DELETE]

(03)XXXX-YYYY

DESTINATION OF E-MAIL  [ADD] [DELETE]

user_a@example.com

DESTINATION OF INSTANT MESSAGE  [ADD] [DELETE]

UserA
UserB

DEVICE REGISTRATION
READ QR CODE WITH DEVICE DESIRED TO BE REGISTERED

FIG.13B

{"id":"file_storage_a","address": "192.168.0.2","file_strage_id": "file_storage_a_id", "activate":"http://192.168.0.2/activate/user1/abcdefghijklmnopqrstuvwxyz", "userid":"User A", "password": "01234567"}

FIG.22

```
"stamp_data":[
    {
        "image":"dGVzdHN0YW1waW1hZ2U=",
        "id":"stamp1",
        "workflow":[
            {"name" : "Workflow1",
             "type" : "copy",
             "id":"workflow1"
            }
        ]
    },
    {
        "image":"eHWaeIO1ZX2xbX2IA3V-",
        "id":" stamp2",
        "workflow":[]
    }
]
}
```

FIG.27

```
{
  "objects":
  [
    {
      "page":1,
      "contents":
      [
        {
          "type":"stamp",
          "top_left":[517,235],
          "bottom_right":[627,82],
          "id":"stamp1",
          "workflow":["workflow1"]
        }
      ]
    }
  ]
}
```

FIG.35A

```
{
"stamp_data":[
    {
    "image":"dGVzdHN0YW1waW1hZ2U=",
    "id":"stamp1",
    "access_by_remote":"False",
    "open_message":"INFORMATION FOR INTERNAL USE ONLY. HANDLE WITH CARE."
    },
]
}
```

FIG.35B

```
{
"stamp_data":[
    {
    "image":"BBVzdAAN0YW1waW1hZ2U=",
    "id":"stamp2",
    "available_stamp":["stamp1","stamp3","stamp4"],
    "exclusive_stamp":["stamp3","stamp4"],
    },
]
}
```

FIG.35C

```
{
"stamp_data":[
    {
        "image":"CCVzdAAN0YW1waW1hZ2U=",
        "id":"stamp3",
        "exclusive_stamp":["stamp2", "stamp4"],
    },
]
}
```

FIG.35D

```
{
"stamp_data":[
    {
    "image":"DDVzdAAN0YW1waW1hZ2U=",
    "id":"stamp4",
    "editable":"False",
    "save_message":"EDITING WILL BE DISABLED.",
    "exclusive_stamp":["stamp2", "stamp3"],
    },
]
}
```

FIG.44

```
{
"objects":
[
  {
  "page":1,
  "contents":
    [
      {
      "type":"stamp",
      "top_left":[517,235],
      "bottom_right":[627,82],
      "id":"stamp1"
      }
    ]
  }
]
}
```

INFORMATION PROCESSING SYSTEM AND METHOD TO EXECUTE A WORKFLOW PROCESSING CORRESPONDING TO AN IMAGE

CROSS-REFERENCE TO RELATED APPLICATIONS

The present application claims priority under 35 U.S.C. § 119 to Japanese Patent Application No. 2015-199675, filed Oct. 7, 2015 and Japanese Patent Application No. 2015-231616, filed Nov. 27, 2015. The contents of which are incorporated herein by reference in their entirety.

BACKGROUND OF THE INVENTION

1. Field of the Invention

The present invention relates to an information processing system and an information processing method.

2. Description of the Related Art

Conventionally, techniques for browsing data stored in a file storage on a local network protected by a firewall with a mobile terminal or the like used by a user outside are known. For example, techniques for enabling a user to browse data stored in a file storage with a mobile terminal or the like used by the user outside via a relay server that relays the data are widely known. A workflow function to add a predetermined setting to a file server in advance, thereby automatically performing processing on the basis of the predetermined setting when data is stored in a specific file path, is also known. A stamp function (image addition function) to add a predetermined image to data being browsed is also known.

Japanese Unexamined Patent Application Publication No. 2010-129093, for example, discloses a technique for arranging and displaying a chat region that holds text and a graphics region that holds graphic objects on a common electronic canvas of a display screen.

The conventional technique, however, fails to cause the image addition function and the workflow function to link. To notify other persons that a user impresses a stamp indicating approval of data on the data, for example, the user needs to inform the other persons of the information by an instant message, an e-mail, or the like.

Japanese Unexamined Patent Application Publication No. 2005-301575 discloses a stamped document preparation and circulation system that implements addition of comments, change of workflow, and sending back of documents at the time of stamping.

The conventional technique, however, fails to control processing to data based on an image added to the data.

SUMMARY OF THE INVENTION

An information processing system includes a terminal, and a file server. The terminal includes a first communication unit, a display unit, and an editing unit. The first communication unit is configured to receive data from the file server. The display unit is configured to display the data. The editing unit is configured to add an image associated with workflow processing, to the data. The first communication unit is further configured to transmit the data to which the image is added, to the file server. The file server includes a second communication unit, and an executing unit. The second communication unit is configured to transmit the data to the terminal and receive the data to which the image is added, from the terminal. The executing unit is configured to execute the workflow processing associated with the image.

BRIEF DESCRIPTION OF THE DRAWINGS

FIG. 6 is a diagram of a setting example of workflow processing (saving) according to the first embodiment;

FIG. 7 is a diagram of a setting example of workflow processing (printing) according to the first embodiment;

FIG. 8 is a diagram of a setting example of workflow processing (periodic deletion) according to the first embodiment;

FIG. 9 is a diagram of a setting example of workflow processing (faxing) according to the first embodiment;

FIG. 13B is a diagram of an example of access information according to the first embodiment;

FIG. 22 is a diagram of an example of stamp information according to the first embodiment;

FIG. 27 is a diagram of an example of edit information according to the first embodiment;

FIG. 35A is a diagram of an example of stamp data (for-internal-use-only stamp) according to the second embodiment (first aspect);

FIG. 35B is a diagram of an example of stamp data (draft stamp) according to the second embodiment (first aspect);

FIG. 35C is a diagram of an example of stamp data (send-back stamp) according to the second embodiment (first aspect);

FIG. 35D is a diagram of an example of stamp data (approved stamp) according to the second embodiment (first aspect);

FIG. 44 is a diagram of an example of edit information according to the second embodiment (first aspect);

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
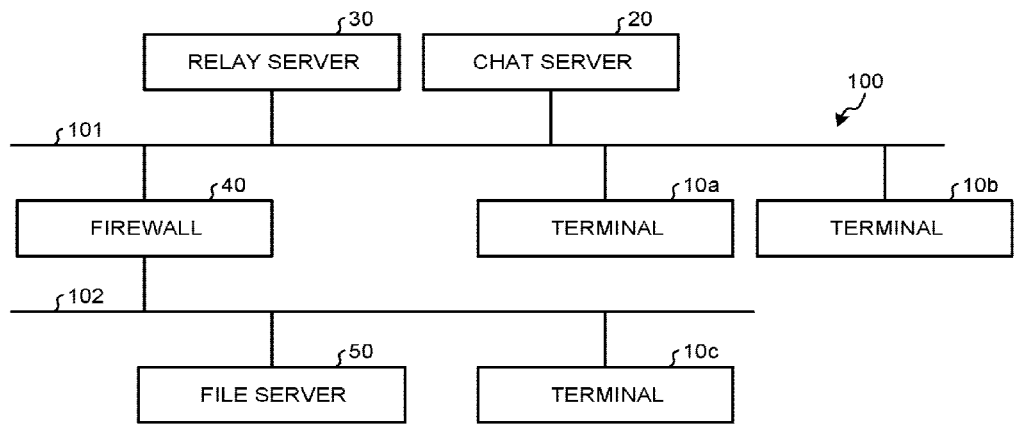
FIG. 1 is a diagram of an exemplary device configuration of an information processing system according to a first embodiment and a second embodiment.

The terminology used herein is for the purpose of describing particular embodiments only and is not intended to be limiting of the present invention.

As used herein, the singular forms "a", an and the are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An Embodiment

Exemplary embodiments of the present invention will be described in detail below with reference to the drawings.

An embodiment has an object to enable the image addition function and the workflow function to be made to link.

Further, an embodiment has an object to control processing to data, based on an image added to the data.

First Embodiment

FIG. 1 is a diagram of an exemplary device configuration of an information processing system 100 according to an embodiment of the present invention. The information processing system 100 according to the embodiment includes terminals 10a to 10c, a chat server 20, a relay server 30, a firewall 40, and a file server 50. The type and the number of the terminals 10a to 10c may be optionally determined. The terminals 10a to 10c are smart devices, for example. In the following description, the terminals 10a to 10c are simply referred to as terminals 10 when the terminals 10a to 10c need not be distinguished.

The terminals 10a and 10b, the chat server 20, the relay server 30, and the firewall 40 are connected to one another via a first network 101. The first network 101 is the Internet, for example. The communication system of the first network 101 may be a wired system or a wireless system. Alternatively, the first network 101 may be implemented by combining a wired system and a wireless system.

The terminal 10c, the firewall 40, and the file server 50 are connected to one another via a second network 102. The second network 102 is a local network, such as an in-house local area network (LAN). The communication system of the second network 102 may be a wired system or a wireless system. Alternatively, the second network 102 may be implemented by combining a wired system and a wireless system.

The first network 101 and the second network 102 are connected by the firewall 40. The firewall 40 controls communications from the first network 101 to the second network 102, thereby maintaining security of the devices connected to the second network 102. Specifically, the firewall 40 prevents the devices connected to the first network 101 other than the relay server 30 from directly accessing the devices connected to the second network 102. By contrast, the firewall 40 permits the devices connected to the second network 102 to directly access the first network 101.

The following describes a functional configuration of the devices connected to the information processing system 100. An exemplary functional configuration of the terminal 10 is described first.

Figure 2:
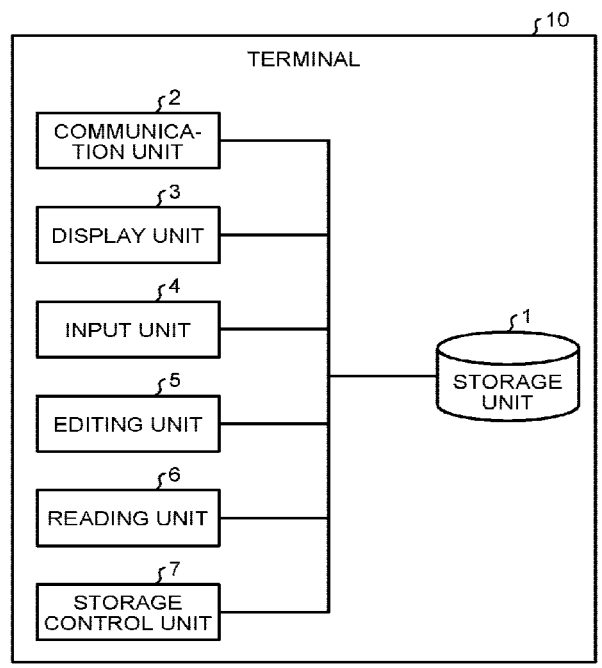
FIG. 2 is a diagram of an exemplary functional configuration of a terminal according to the first embodiment.

FIG. 2 is a diagram of an exemplary functional configuration of the terminal 10 according to the embodiment. The terminal 10 according to the embodiment includes a storage unit 1, a communication unit 2, a display unit 3, an input unit 4, an editing unit 5, a reading unit 6, and a storage control unit 7.

The storage unit 1 stores therein information. The information stored in the storage unit 1 is data acquired from the file server 50, for example.

The communication unit 2 communicates with other devices. The communication unit 2 transmits a request to the file server 50, for example, to the relay server 30. The request includes identification information for identifying the terminal 10 serving as a source, identification information for identifying the file server 50, and information indicating acquisition, addition, change, or deletion of data, for example.

The display unit 3 displays information. The display unit 3 displays a screen for selecting data to be edited, a screen for editing data to be edited, and a chat screen using the chat server 20, for example.

The input unit 4 receives input of information from a user. The editing unit 5 edits data. The reading unit 6 reads information. The reading unit 6 is an image-capturing device (camera) that reads a two-dimensional code, for example. The storage control unit 7 adds, changes or deletes data stored in the storage unit 1.

The following describes an exemplary functional configuration of the chat server 20. The chat server 20 receives messages and the like in a chat performed among the users of the terminals 10 and distributes the messages in the chat.

Figure 3:
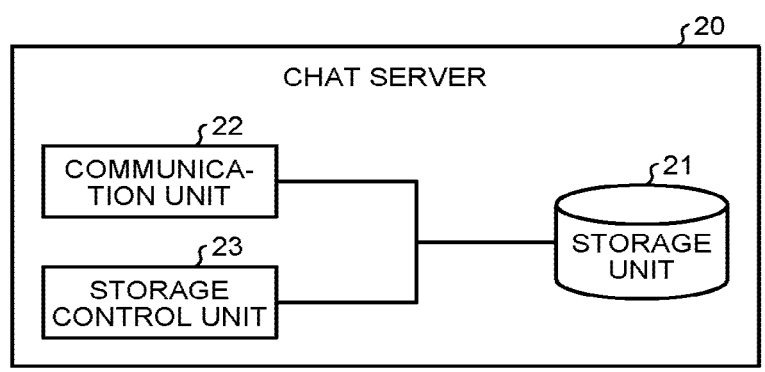
FIG. 3 is a diagram of an exemplary functional configuration of a chat server according to the first embodiment.

FIG. 3 is a diagram of an exemplary functional configuration of the chat server 20 according to the embodiment. The chat server 20 according to the embodiment includes a storage unit 21, a communication unit 22, and a storage control unit 23.

The storage unit 21 stores therein information. The information stored in the storage unit 21 is user information, for example. The user information includes identification information for identifying a user and specification information for specifying a destination of a message to the user, for example.

The communication unit 22 communicates with other devices. When receiving a message in a chat from the terminal 10, for example, the communication unit 22 specifies a destination of the message and transmits the message to the terminal 10 serving as the specified destination.

The storage control unit 23 adds, changes or deletes data stored in the storage unit 21.

The following describes an exemplary functional configuration of the relay server 30. The relay server 30 receives a request to the file server 50 from the devices connected to the first network 101 and relays the request to the file server 50.

Figure 4:
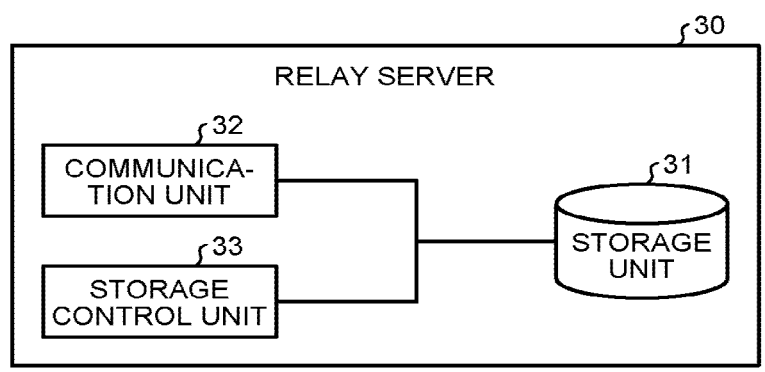
FIG. 4 is a diagram of an exemplary functional configuration of a relay server according to the first embodiment.

FIG. 4 is a diagram of an exemplary functional configuration of the relay server 30 according to the embodiment.

The relay server 30 according to the embodiment includes a storage unit 31, a communication unit 32, and a storage control unit 33.

The storage unit 31 stores therein information. The information stored in the storage unit 31 is data received from the terminal 10 via the communication unit 32, for example.

The communication unit 32 communicates with other devices. The communication unit 32 receives the abovementioned request to the file server 50 from the terminal 10 connected to the first network 101, for example. When receiving an inquiry about a request from the file server 50, the communication unit 32 transmits a request including the identification information for identifying the file server 50 to the file server 50. When receiving a processing result of the request from the file server 50, the communication unit 32 transmits the processing result to the terminal 10 that transmits the request.

The storage control unit 33 adds, changes or deletes data stored in the storage unit 31. When receiving a request from the terminal 10 connected to the first network 101, for example, the storage control unit 33 stores the request in the storage unit 31.

The following describes an exemplary functional configuration of the file server 50. The file server 50 periodically inquires of the relay server 30 whether the relay server 30 receives the request to the file server 50, thereby processing the request.

Figure 5:
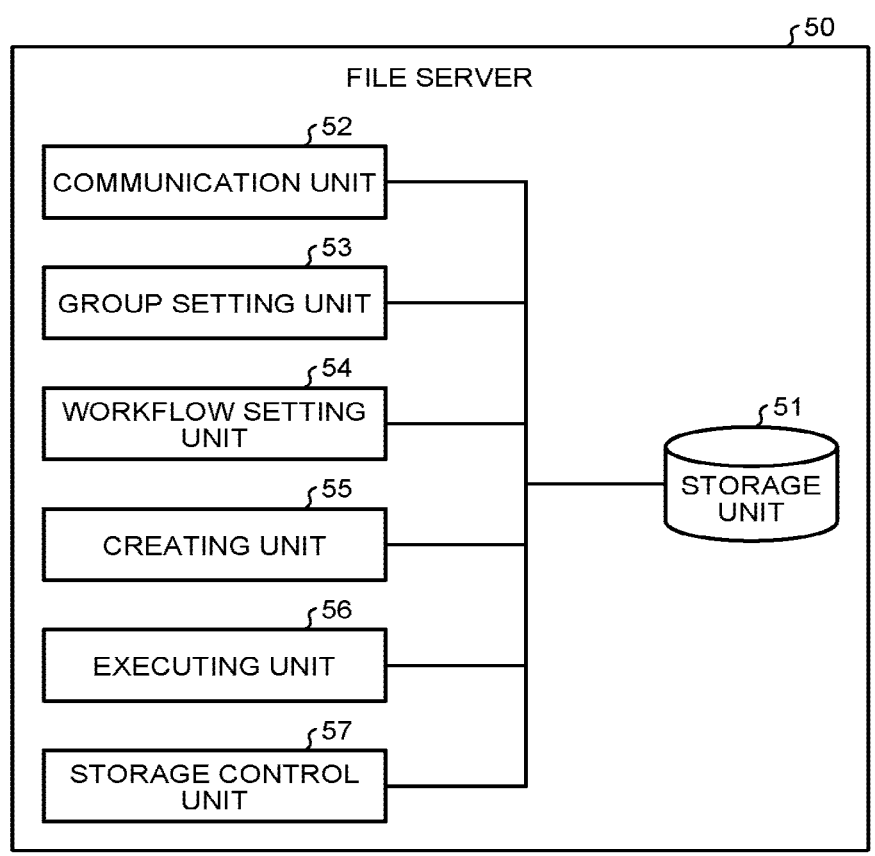
FIG. 5 is a diagram of an exemplary functional configuration of a file server according to the first embodiment.

FIG. 5 is a diagram of an exemplary functional configuration of the file server 50 according to the embodiment. The file server 50 according to the embodiment includes a storage unit 51, a communication unit 52, a group setting unit 53, a workflow setting unit 54, a creating unit 55, an executing unit 56, and a storage control unit 57.

The storage unit 51 stores therein information. The information stored in the storage unit 51 is user information, group information, log information, and association information, for example. The user information is the same as explained in the description of the chat server 20. The group information includes a group name and identification information on the user registered in the group, for example. The log information includes history information on messages transmitted and received in a chat, for example. The association information indicates association between an image and workflow processing. The image may be any image. In the description of the embodiment, the image is a stamp, for example.

Table 1 indicates an example of the association information according to the embodiment.

TABLE 1

| id | image file path | workflow name |
|---|---|---|
| stamp1 | /AllUsers/shonin.png | Workflow1 |
| stamp2 | /AllUsers/stamp2.png | |
| ... | ... | ... |

The association information according to the embodiment includes id, an image file path, and a workflow name. "id" is identification information for identifying association information on a stamp. The image file path indicates a storage location of an image used as the stamp. The workflow name is a name of workflow processing. If no workflow name is set, there is no workflow processing associated with the stamp. Examples of the workflow processing will be described later with reference to FIGS. 6 to 9.

In a case where id indicates a stamp of stamp1, the storage location of an image used as the stamp is /AllUsers/shonin.png, and the name of workflow processing associated therewith is Workflow1. In a case where id indicates a stamp of stamp2, the storage location of an image used as the stamp is /AllUsers/shonin2.png, and there is no workflow processing associated therewith.

The group setting unit 53 sets the group information. The group setting unit 53 may synchronize the user information stored in the chat server 20, thereby acquiring candidates of users required to set the group information from the chat server 20.

The workflow setting unit 54 sets workflow processing and stores the set workflow processing as workflow setting information in the storage unit 51 via the storage control unit 57. The following describes examples of the workflow processing.

FIG. 6 is a diagram of a setting example of workflow processing (saving) according to the embodiment. In the example illustrated in FIG. 6, the workflow name is set to Workflow1.

The type of processing performed in the workflow is "save data". The format of saved data is set to Portable Document Format (PDF). The destination to save is set to "/allusers/approved document". With these settings, when a stamp associated with Workflow1 is impressed on data, the executing unit 56 converts the data format of the data into PDF and stores the data resulting from conversion into PDF in "/allusers/approved document".

The destination of an e-mail is set to user_a@example.com. The destination of an instant message is set to UserA and UserB. With these settings, the executing unit 56 transmits the processing result of processing to "save data" to user_a@example.com by an e-mail and to UserA and UserB by an instant message via the communication unit 52.

FIG. 7 is a diagram of a setting example of workflow processing (printing) according to the embodiment. In the example illustrated in FIG. 7, the workflow name is set to Workflow2.

The type of processing performed in the workflow is "print data by a printer". The address of the printer is set to 192.168.0.20. The setting in printing is made as follows: the number of copies is 1, the printing mode is full-color printing and single-sided printing, and the sheet size is automatically selected. With these settings, when a stamp associated with Workflow2 is impressed on data, the executing unit 56 generates a print job for printing the data and transmits the print job to the printer via the communication unit 52.

The destination of an e-mail is set to user_a@example.com. The destination of an instant message is set to UserA and UserB. With these settings, the executing unit 56 transmits the processing result of processing to "print data by a printer" to user_a@example.com by an e-mail and to UserA and UserB by an instant message via the communication unit 52.

FIG. 8 is a diagram of a setting example of workflow processing (periodic deletion) according to the embodiment. In the example illustrated in FIG. 8, the workflow name is set to Workflow3.

The type of processing performed in the workflow is "delete data after a certain period of time". The format of saved data is set to PDF. The destination to save is set to "/allusers/approved document". With these settings, when a stamp associated with Workflow3 is impressed on data, the executing unit 56 converts the data format of the data into PDF and stores the data resulting from conversion into PDF in "/allusers/approved document".

A setting is made so as to delete data when 30 days have elapsed since the data was saved in the destination to save. With this setting, when 30 days have elapsed since the data was saved, the executing unit 56 deletes the data.

The destination of an e-mail is set to user_a@example.com. The destination of an instant message is set to UserA and UserB. With these settings, the executing unit 56 transmits the processing result of processing to "delete data after a certain period of time" to user_a@example.com by an e-mail and to UserA and UserB by an instant message via the communication unit 52. The executing unit 56 may notify that the data is to be deleted in 30 days, when data is stored.

FIG. 9 is a diagram of a setting example of workflow processing (faxing) according to the embodiment. In the example illustrated in FIG. 9, the workflow name is set to Workflow4.

The type of processing performed in the workflow is "send data by a facsimile". The address of the facsimile is set to 192.168.0.21. The destination is set to (03)XXXX-YYYY. With these settings, when a stamp associated with Workflow4 is impressed on data, the executing unit 56 sends the data and the destination of (03)XXXX-YYYY to the facsimile via the communication unit 52.

The destination of an e-mail is set to user_a@example.com. The destination of an instant message is set to UserA and UserB. With these settings, the executing unit 56 transmits the processing result of processing to "send data by a facsimile" to user_a@example.com by an e-mail and to UserA and UserB by an instant message via the communication unit 52.

Referring back to FIG. 5, the creating unit 55 associates a stamp and workflow processing, thereby creating a stamp associated with workflow processing.

Figure 10:
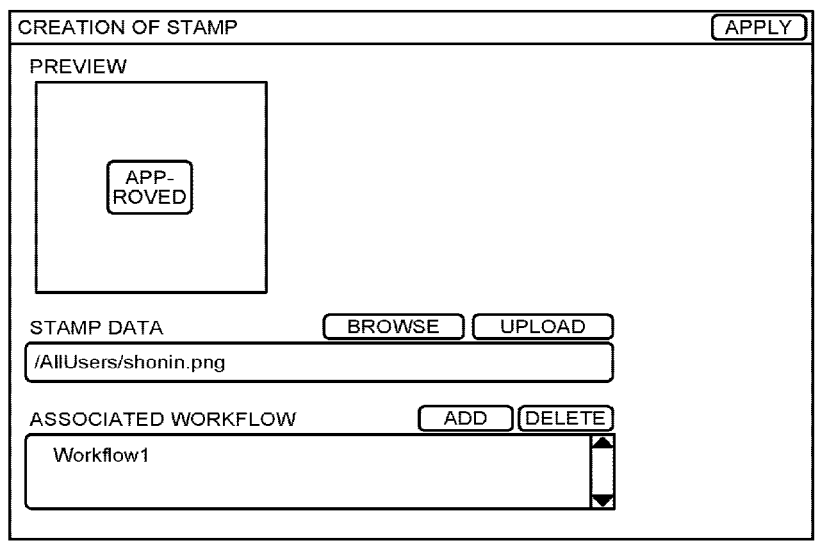
FIG. 10 is a diagram of an example of a creation screen according to the first embodiment.

FIG. 10 is a diagram of an example of a creation screen according to the embodiment. In the example illustrated in FIG. 10, a browser or the like of the terminal 10 displays the creation screen for a stamp as a web user interface (UI). A preview indicates an image used as a stamp.

Stamp data indicates a storage location of an image used as a stamp. When a browse button is pressed, stamp data stored in the storage location is displayed. An associated workflow indicates the name of workflow processing associated with the stamp. When an upload button is pressed, the stamp data and the workflow name specified on the creation screen are transmitted to the file server 50 as the association information. In the example illustrated in FIG. 10, an image stored in /AllUsers/shonin.png is used as a stamp, and Workflow1 is associated with the image. The number of workflows associated with a stamp is not limited to one, and a plurality of workflows may be associated with a stamp.

Referring back to FIG. 5, the executing unit 56 executes workflow processing associated with a stamp. The storage control unit 57 adds, changes or deletes data stored in the storage unit 51.

The following describes an information processing method according to the embodiment.

The present embodiment performs pairing (device registration) of the terminal 10 and the file server 50 before establishing communications between the terminal 10 and the file server 50. The file server 50 according to the embodiment establishes communications with a registered terminal 10 and does not establish communications with a non-registered terminal 10.

The following describes an example of a method for pairing the terminal 10 and the file server 50.

Figure 11:
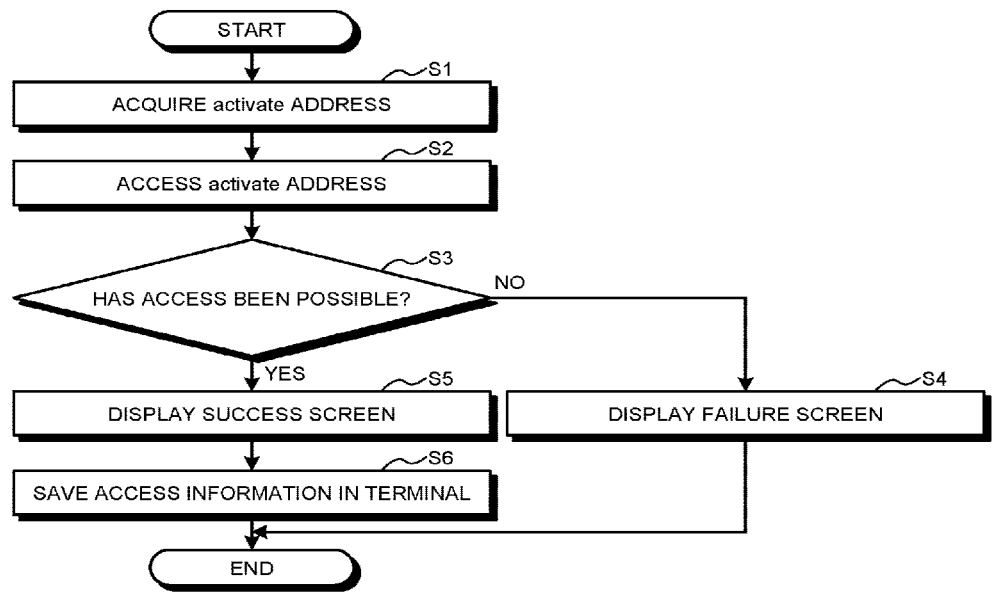
FIG. 11 is a flowchart of an example of a pairing method according to the first embodiment.

FIG. 11 is a flowchart of an example of the pairing method according to the embodiment. The terminal 10 acquires an activate address (Step S1). The activate address is an address of the file server 50 to which the terminal 10 is connected first to pair the file server 50 and the terminal 10.

The method for acquiring the activate address may be any method. The terminal 10, for example, may read access information including the activate address by the reading unit 6, thereby acquiring the activate address. The access information is displayed as a two-dimensional code on a web UI, such as a browser or the like of a personal computer. The two-dimensional code is a QR code (registered trademark), for example.

Figure 12:
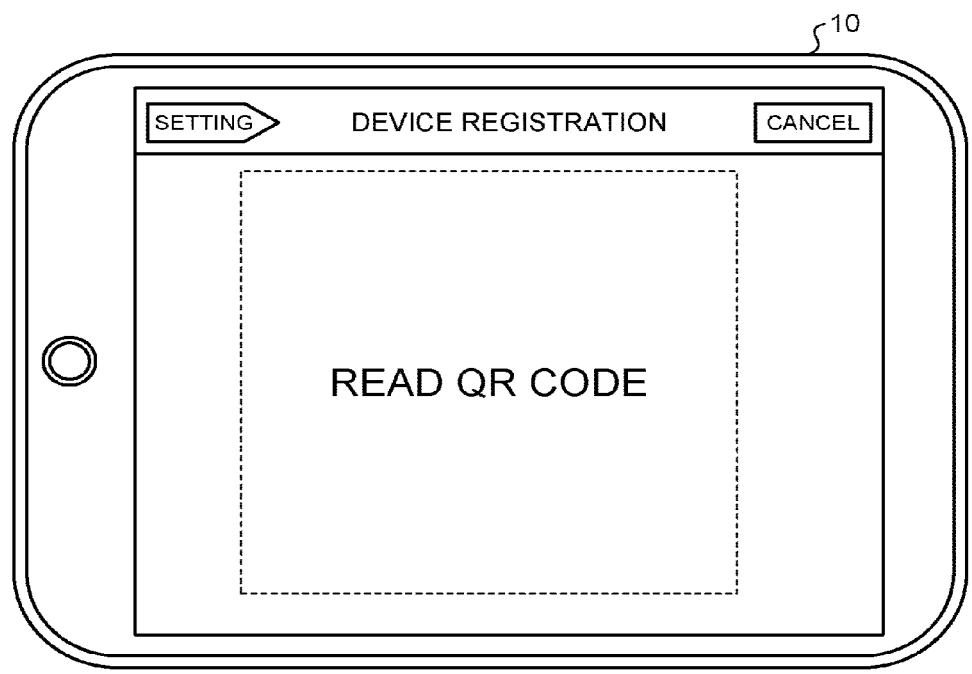
FIG. 12 is a diagram of an example of a reading screen according to the first embodiment.

FIG. 12 is a diagram of an example of a reading screen according to the embodiment. FIG. 12 illustrates an example of the reading screen displayed on the terminal 10 when the reading unit 6 of the terminal 10 reads a QR code (registered trademark) serving as the two-dimensional code.

Figure 13A:
FIG. 13A is a diagram of an example of a two-dimensional code according to the first embodiment.

FIG. 13A is a diagram of an example of the two-dimensional code according to the embodiment. In the example illustrated in FIG. 13A, a QR code (registered trademark) is used as the two-dimensional code.

FIG. 13B is a diagram of an example of the access information according to the embodiment. In the example illustrated in FIG. 13B, the two-dimensional code includes id, address, file_storage_id, activate, userid, and password. "id" is identification information for identifying the file server 50. In the example illustrated in FIG. 13B, id is "file_storage_a". "address" is an Internet Protocol (IP) address of the file server 50. In the example illustrated in FIG. 13B, the address is "192.168.0.2". "file_storage_id" is identification information referred to by the relay server 30 to identify the file server 50. In the example illustrated in FIG. 13B, the file_storage_id is "file_storage_a_id". "activate" is the activate address. In the example illustrated in FIG. 13B, the activate address is "http://192.168.0.2/activate/user1/abcdefghijklmnopqrstuvwxyz". "userid" is identification information for identifying the user of the terminal 10. In the example illustrated in FIG. 13B, the userid is "UserA". "password" is a password of the user of the terminal 10. In the example illustrated in FIG. 13B, the password is "01234567".

Referring back to FIG. 11, the communication unit 2 of the terminal 10 accesses the activate address acquired at Step S1 (Step S2). Subsequently, the communication unit 2 of the terminal 10 determines whether the access has been possible (Step S3). If the communication unit 2 fails to access the activate address (No at Step S3), the display unit 3 of the terminal 10 displays a failure screen indicating that the terminal 10 fails to access the file server 50 (Step S4).

If the communication unit 2 has accessed the activate address (Yes at Step S3), the display unit 3 of the terminal 10 displays a success screen indicating that the terminal 10 succeeded in accessing the file server 50 (Step S5). If the terminal 10 succeeds in accessing the file server 50, the file server 50 stores information indicating the user of the terminal 10 (userid and password) as a registered user.

Figure 14:
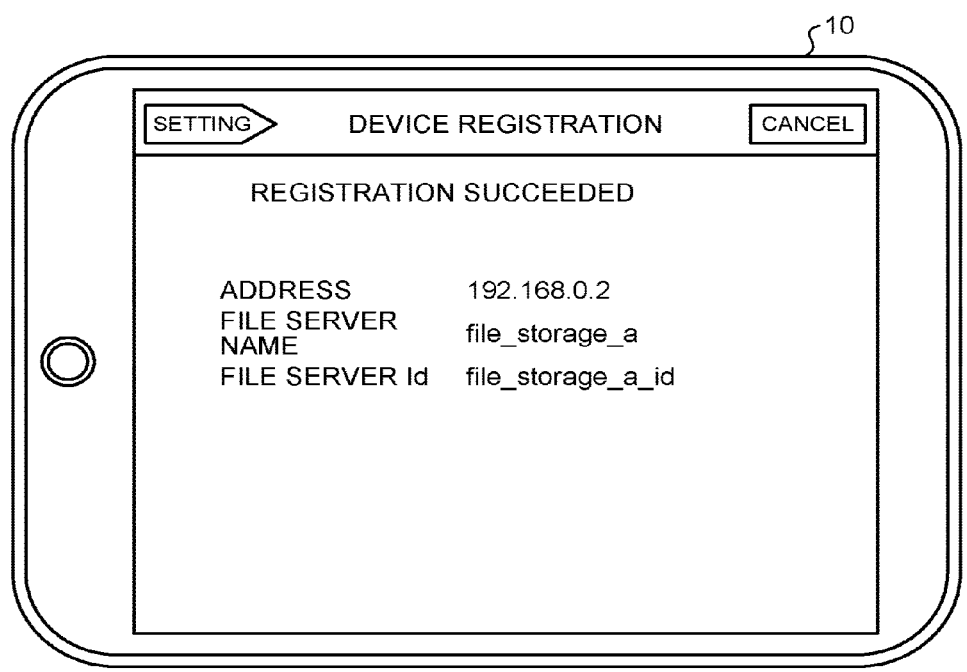
FIG. 14 is a diagram of an example of a success screen according to the first embodiment.

FIG. 14 is a diagram of an example of the success screen according to the embodiment. In the example illustrated in FIG. 14, the display unit 3 of the terminal 10 displays the address (192.168.0.2), the file server name (file_storage_a), and the file server Id (file_storage_a_id).

Referring back to FIG. 11, the storage control unit 7 of the terminal 10 saves the access information in the terminal 10 (Step S6).

The following describes an example of a method for setting a group of the users of the terminals 10.

Figure 15:
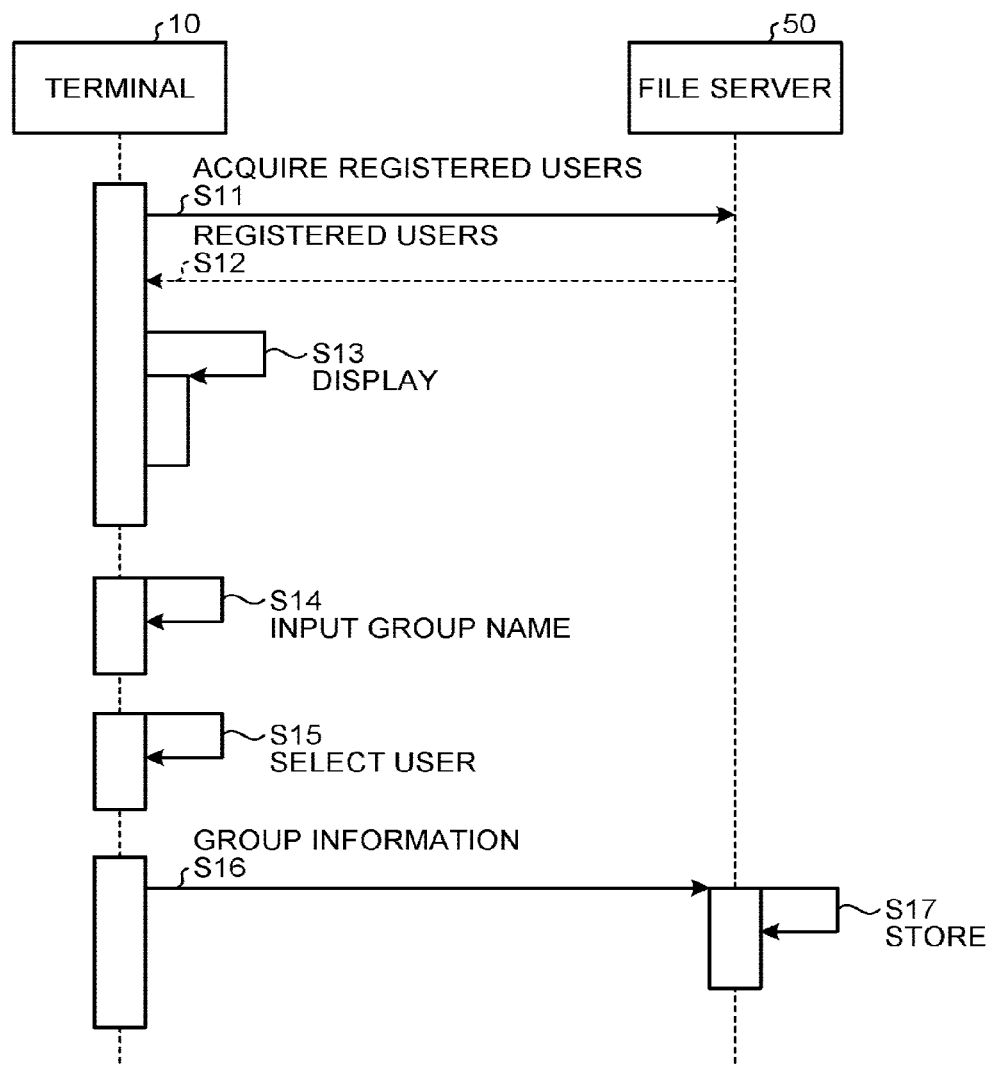
FIG. 15 is a sequence diagram of an example of a group setting method according to the first embodiment.

FIG. 15 is a sequence diagram of an example of the group setting method according to the embodiment. In the example illustrated in FIG. 15, the relay server 30 is not illustrated because the relay server 30 performs no processing other than relaying the communications between the terminal 10 and the file server 50.

The communication unit 2 of the terminal 10 transmits a request to acquire registered users to the file server 50 (Step S11). The group setting unit 53 of the file server 50 transmits information indicating the registered users stored in the storage unit 51 to the terminal 10 via the communication unit 52 (Step S12). The display unit 3 displays a group setting screen including the information indicating the registered users (Step S13). The input unit 4 of the terminal 10 receives input of a group name (Step S14). The input unit 4 of the terminal 10 selects a user to be registered in the group (Step S15).

Figure 16:
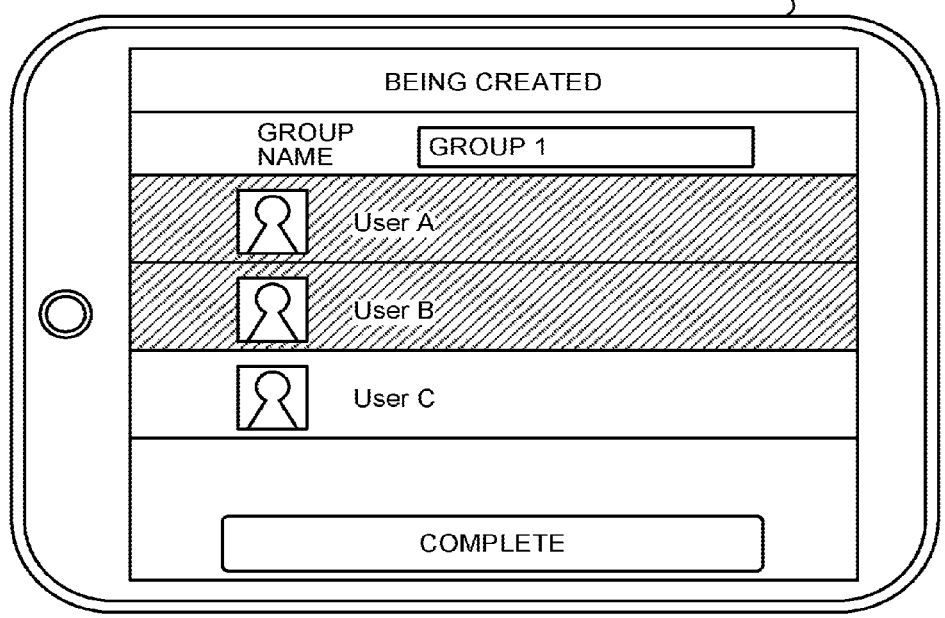
FIG. 16 is a diagram of an example of a group setting screen according to the first embodiment.

FIG. 16 is a diagram of an example of the group setting screen according to the embodiment. In the example illustrated in FIG. 16, UserA, UserB, and UserC are displayed as the information indicating the registered users, a group 1 is input as the group name, and UserA and UserB are selected as the users to be registered in the group. If the input unit 4 of the terminal 10 receives a pressing of a complete button, the communication unit 2 transmits the group information including the group name input at Step S14 and the users selected at Step S15 to the file server 50 (Step S16).

If the group setting unit 53 of the file server 50 receives the group information from the terminal 10 via the communication unit 52, the group setting unit 53 stores the group information in the storage unit 51 via the storage control unit 57 (Step S17).

Figure 17:
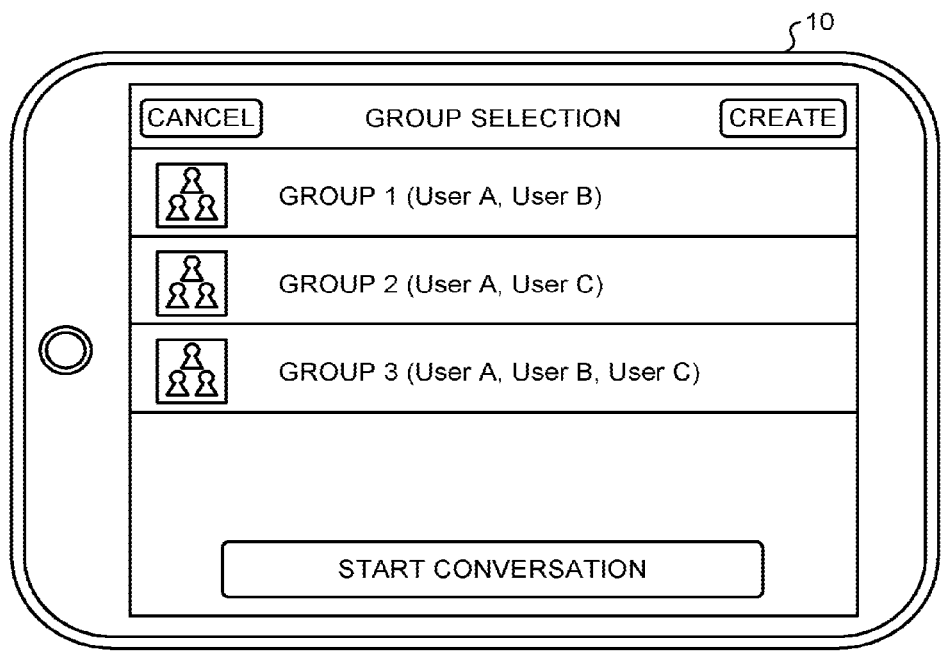
FIG. 17 is a diagram of an example of a group selection screen according to the first embodiment.

FIG. 17 is a diagram of an example of a group selection screen according to the embodiment. In the example illustrated in FIG. 17, a group 1 including UserA and UserB, a group 2 including UserA and UserC, and a group 3 including UserA, UserB, and UserC are displayed as selectable groups. The display unit 3 of the terminal 10 acquires the list of groups displayed on the group selection screen from the file server 50 via the communication unit 2. If the input unit 4 of the terminal 10 receives the pressing of a start-conversation button when a group is selected, the display unit 3 displays a chat screen.

Figure 18:
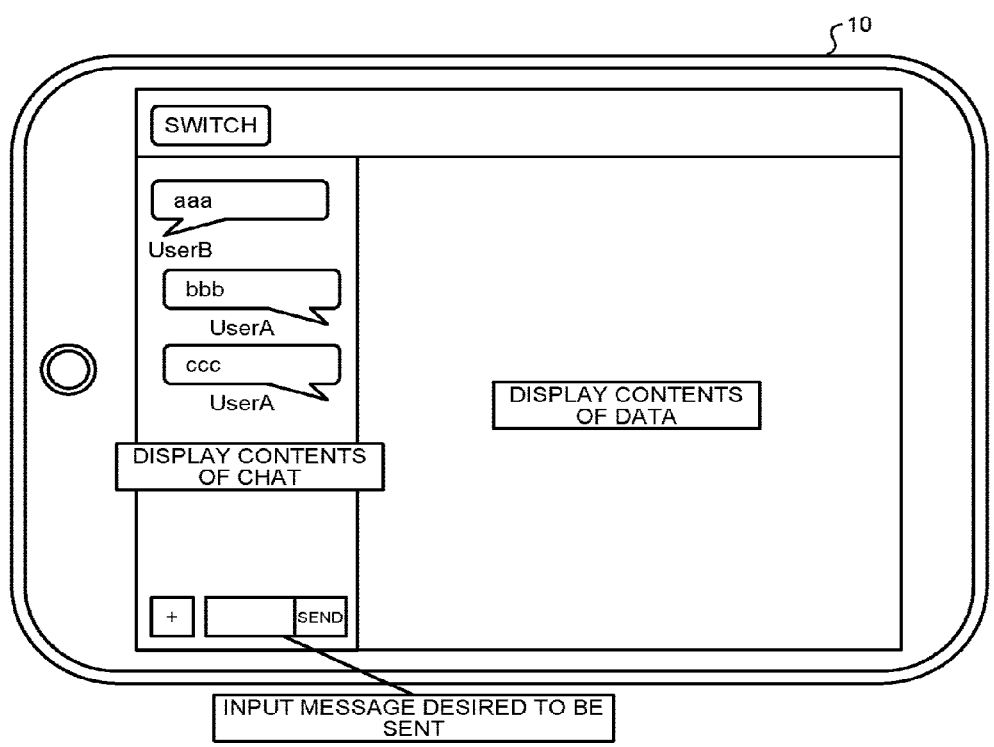
FIG. 18 is a diagram of an example of a chat screen according to the first embodiment.

FIG. 18 is a diagram of an example of the chat screen according to the embodiment. In the example illustrated in FIG. 18, a conversation content display area that displays conversation contents of a chat is arranged on the left side of the screen, a box that receives a message is arranged at the lower part of the conversation content display area, and a data display area that displays data is arranged on the right side of the screen. When the user presses a switch button, the data display area displays data selected from a data selection area (refer to FIG. 20, which will be described later) displayed on the left side of the screen.

The following describes a workflow execution control method according to the embodiment.

Figure 19:
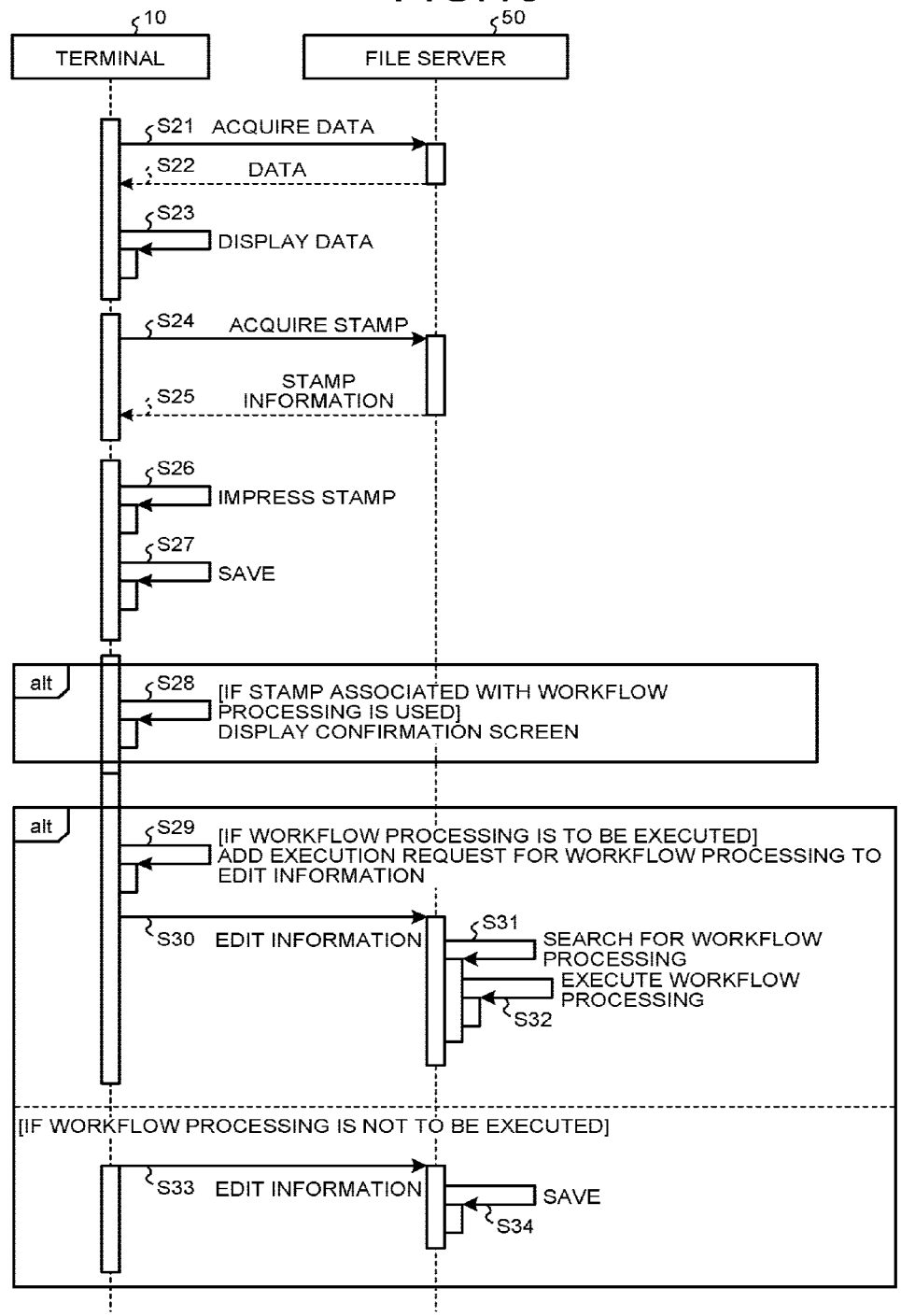
FIG. 19 is a sequence diagram of an example of a workflow execution control method according to the first embodiment.

FIG. 19 is a sequence diagram of an example of the workflow execution control method according to the embodiment. The display unit 3 of the terminal 10 displays a data selection screen, and the communication unit 2 transmits a request to acquire data selected on the data selection screen to the file server 50 (Step S21).

Figure 20:
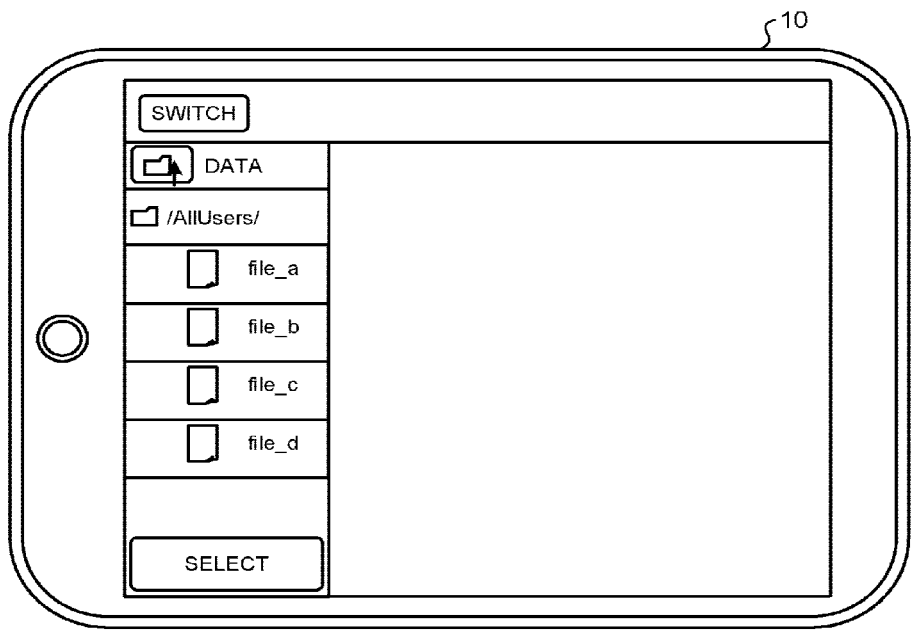
FIG. 20 is a diagram of an example of a data selection screen according to the first embodiment.

FIG. 20 is a diagram of an example of the data selection screen according to the embodiment. In the example illustrated in FIG. 20, the data selection area is displayed on the left side of the screen. If the input unit 4 of the terminal 10 receives a pressing of a select button when data is selected in the data selection area, the communication unit 2 transmits a request to acquire the data to the file server 50. If the input unit 4 of the terminal 10 receives a pressing of the switch button, the display unit 3 switches the data selection area and the conversation content display area (refer to FIG. 18).

Referring back to FIG. 19, the communication unit 2 of the terminal 10 receives the data corresponding to the request transmitted at Step S21 from the file server 50 (Step S22). The display unit 3 of the terminal 10 displays the data received at Step S22 (Step S23).

Figure 21:
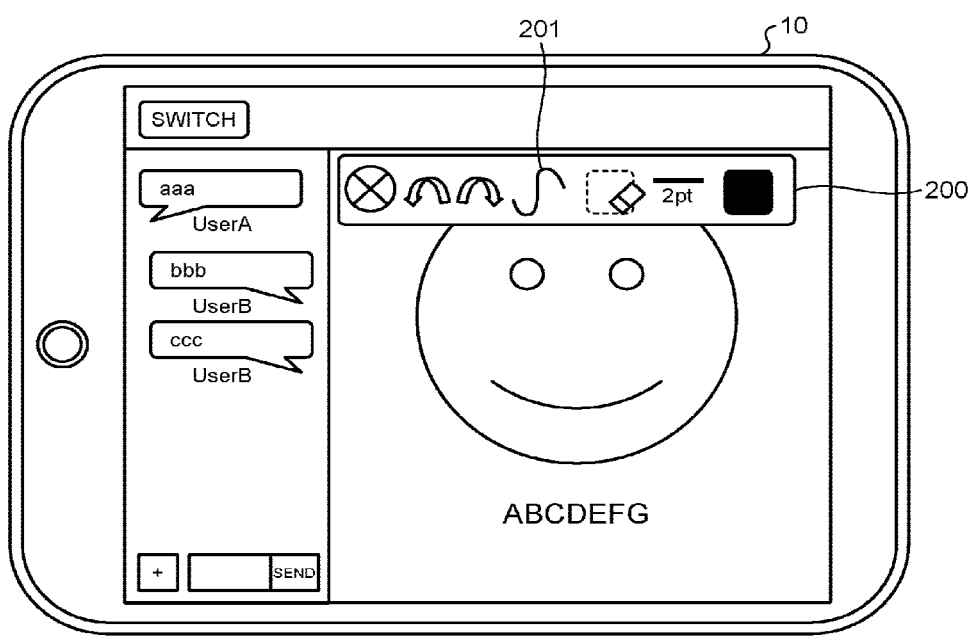
FIG. 21 is a diagram of an example of a data display screen according to the first embodiment.

FIG. 21 is a diagram of an example of a data display screen according to the embodiment. In the example illustrated in FIG. 21, the data display area that displays data is arranged on the right side of the screen. A toolbar 200 used to edit data is displayed at the upper part of the data display area. When the toolbar 200 is opened, an edit mode is activated. A symbol 201 indicates a mode to add a line to the data.

Referring back to FIG. 19, the communication unit 2 of the terminal 10 transmits a request to acquire a stamp to the file server 50 (Step S24). The communication unit 52 of the file server 50 transmits stamp information including the association information to the terminal 10 (Step S25).

FIG. 22 is a diagram of an example of the stamp information according to the embodiment. In the example illustrated in FIG. 22, the data format of the stamp information is a Json format. "image" is a character string obtained by performing base 64 encoding on binary data indicating an image. "id" is identification information for identifying a stamp. "workflow" is information on workflow processing associated with the stamp. "workflow" includes name, type, and id. "name" indicates the name of the workflow. "type" indicates the type of the workflow processing. "id" is identification information for identifying the workflow processing. The example illustrated in FIG. 22 includes a stamp having id of stamp1 and a stamp having id of stamp2. The stamp having id of stamp1 is associated with workflow processing, but the stamp having id of stamp2 is associated with no workflow processing.

Figure 23:
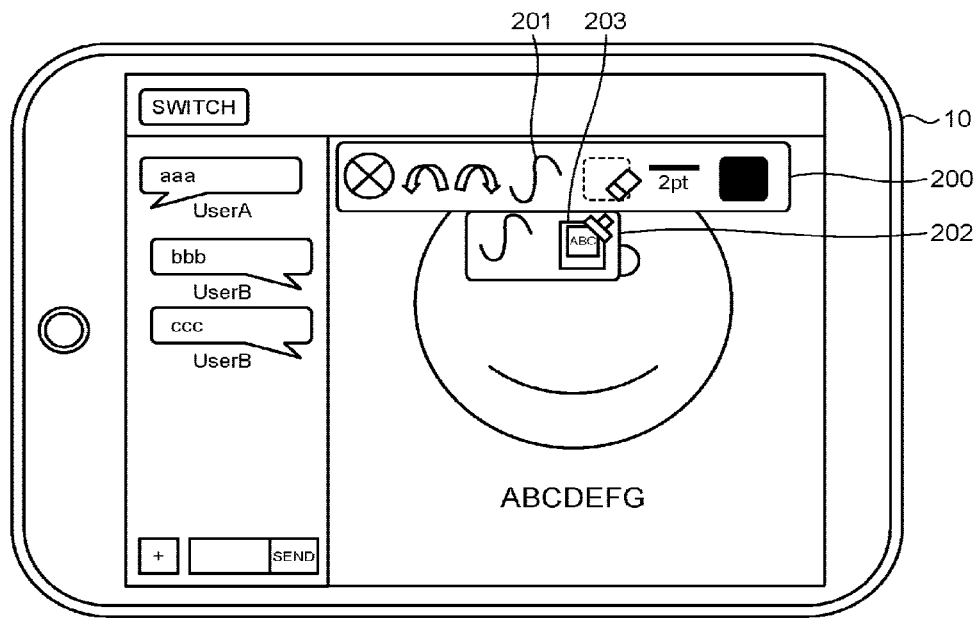
FIG. 23 is a diagram of an example of an edit screen according to the first embodiment.

FIG. 23 is a diagram of an example of an edit screen according to the embodiment. In the example illustrated in FIG. 23, the symbol 201 in the toolbar 200 is pressed, whereby a toolbar 202 is displayed. When a symbol 203 in the toolbar 202 is pressed, the display unit 3 of the terminal 10 displays a stamp selection screen.

Figure 24:
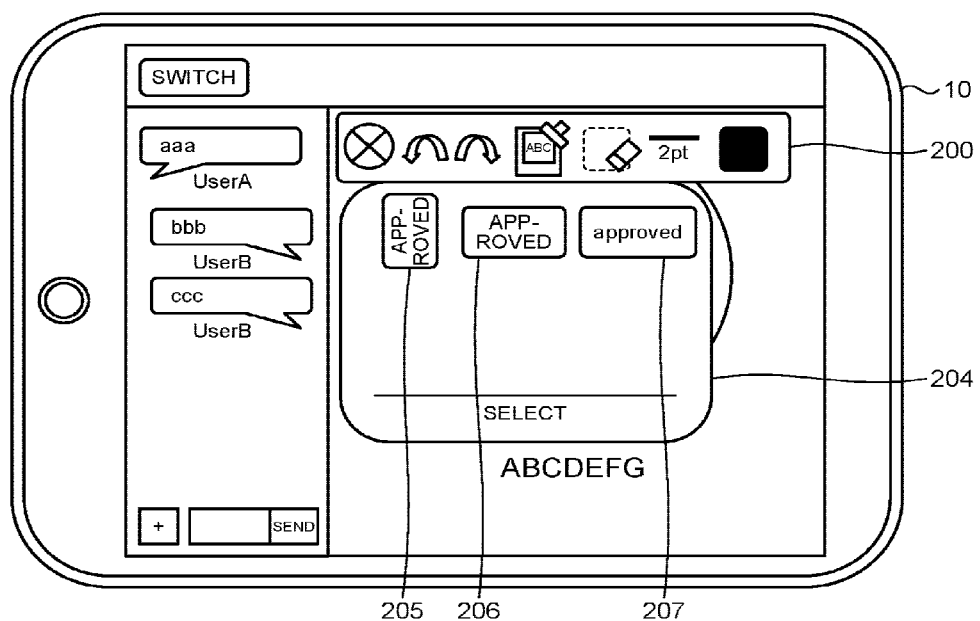
FIG. 24 is a diagram of an example of a stamp selection screen according to the first embodiment.

FIG. 24 is a diagram of an example of the stamp selection screen according to the embodiment. In the example illustrated in FIG. 24, a window 204 for selecting a stamp is displayed. In the example illustrated in FIG. 24, the window 204 includes a stamp 205, a stamp 206, and a stamp 207. The input unit 4 of the terminal 10 receives input for selecting a stamp on the window 204.

Referring back to FIG. 19, the input unit 4 of the terminal 10 receives input of impressing a stamp (Step S26).

Figure 25:
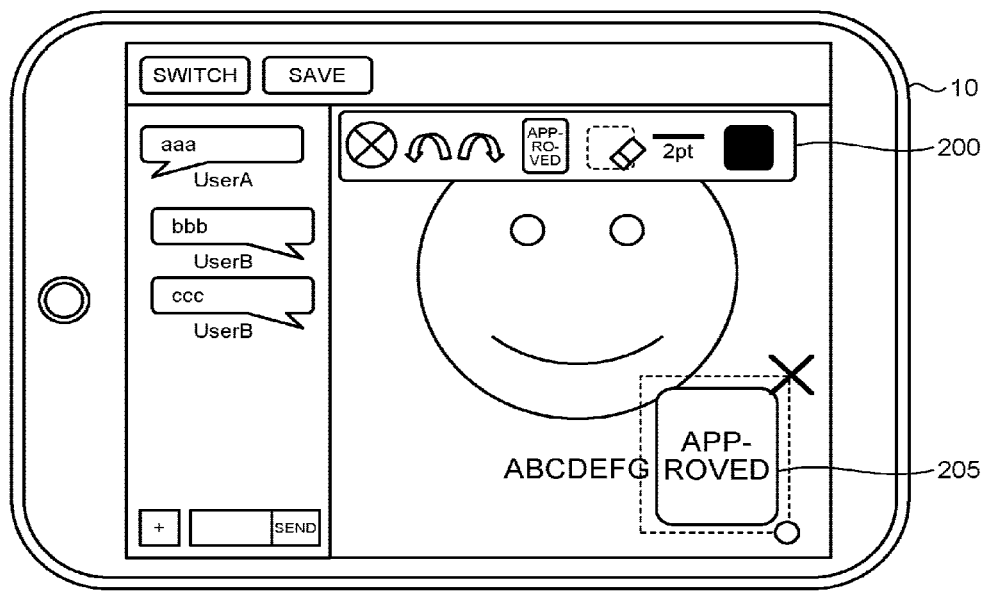
FIG. 25 is a diagram of an example of data to which a stamp is added according to the first embodiment.

FIG. 25 is a diagram of an example of data to which a stamp is added according to the embodiment. In the example illustrated in FIG. 25, the stamp 205 selected on the stamp selection screen is impressed (added) on the data. If the input unit 4 of the terminal 10 receives an operation of pressing the cross button arranged at the upper right of the stamp 205, the display unit 3 of the terminal 10 deletes the stamp 205. If the input unit 4 receives an operation of dragging and dropping the stamp 205, the display unit 3 changes the display position of the stamp 205 in response to the drag-and-drop operation. If the input unit 4 receives an operation of sliding the circle button arranged at the lower right of the stamp 205, the display unit 3 changes the size of the stamp 205 in response to the slide operation.

The display unit 3 of the terminal 10 may add and display additional information to the stamp 205. The additional information is a user name and time information, for example. The time information indicates the time and date when the stamp 205 is impressed, for example.

Referring back to FIG. 19, the input unit 4 of the terminal 10 receives a pressing of a save button (refer to FIG. 25) (Step S27). If a stamp associated with workflow processing is used, the display unit 3 of the terminal 10 displays a confirmation screen (Step S28).

Figure 26:
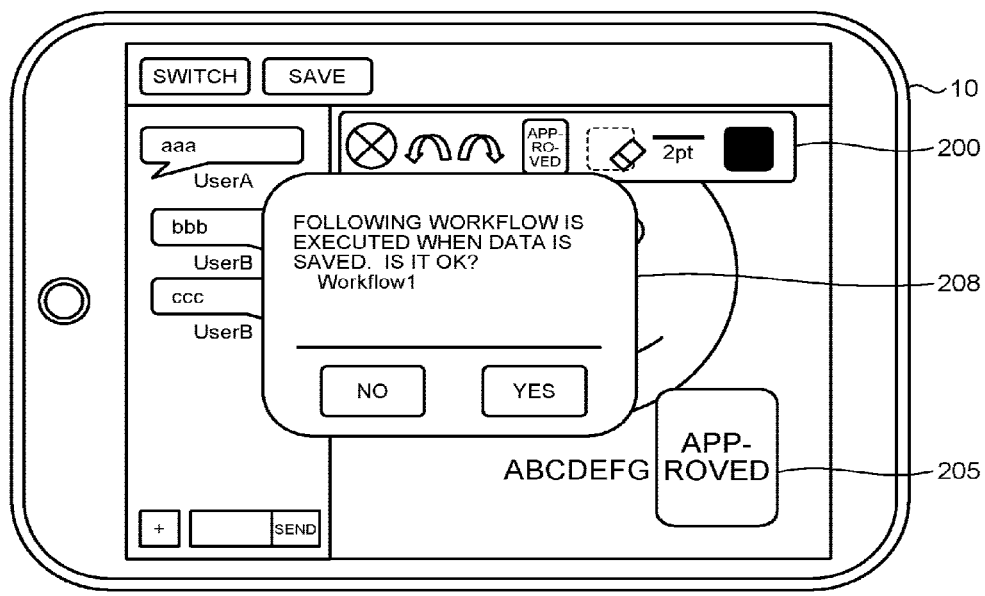
FIG. 26 is a diagram of an example of a confirmation screen according to the first embodiment.

FIG. 26 is a diagram of an example of the confirmation screen according to the embodiment. In the example illustrated in FIG. 26, a window 208 for confirming whether to execute the workflow processing associated with the stamp is displayed. In the example illustrated in FIG. 26, Workflow1 is displayed as the workflow processing associated with the stamp.

Referring back to FIG. 19, if the workflow processing is to be executed (if an Yes button is pressed in the window 208 in FIG. 26), the editing unit 5 of the terminal 10 adds an execution request for the workflow processing to edit information (Step S29).

FIG. 27 is a diagram of an example of the edit information according to the embodiment. In the example illustrated in FIG. 27, the data format of the edit information is a Json format. "objects" indicates a drawing object. "page" indicates a page including contents. "contents" indicates a unit of drawing and includes type, top_left, bottom_right, id, and workflow. "type" indicates the type of drawing. "top_left" and "bottom_right" indicate a drawing position. "id" indicates identification information on a stamp. "workflow" indicates workflow processing associated with the stamp. In the example illustrated in FIG. 27, "workflow":["workflow1"] is added to the edit information as the execution request for the workflow processing.

Referring back to FIG. 19, the communication unit 2 of the terminal 10 transmits the edit information to the file server 50 (Step S30). If the communication unit 52 of the file server 50 receives the edit information, the executing unit 56 searches for the workflow processing associated with the stamp included in the edit information from workflow setting information in the storage unit 51 (Step S31). The executing unit 56 executes the workflow processing searched for at Step S31 (Step S32).

By contrast, if the workflow processing is not to be executed (if a No button is pressed in the window 208 in FIG. 26), the editing unit 5 of the terminal 10 transmits the edit information to the file server 50 via the communication unit 2 without adding any execution request for workflow processing to the edit information (Step S33). The storage control unit 57 of the file server 50 updates and saves the data in the storage unit 51 on the basis of the edit information (Step S34).

In the description with reference to FIG. 19, the executing unit 56 determines whether to execute workflow processing on the basis of whether the edit information includes an execution request. Alternatively, another determination method may be employed. The executing unit 56, for example, may determine whether workflow processing is associated with the stamp included in the edit information by the determination method illustrated in FIG. 28.

Figure 28:
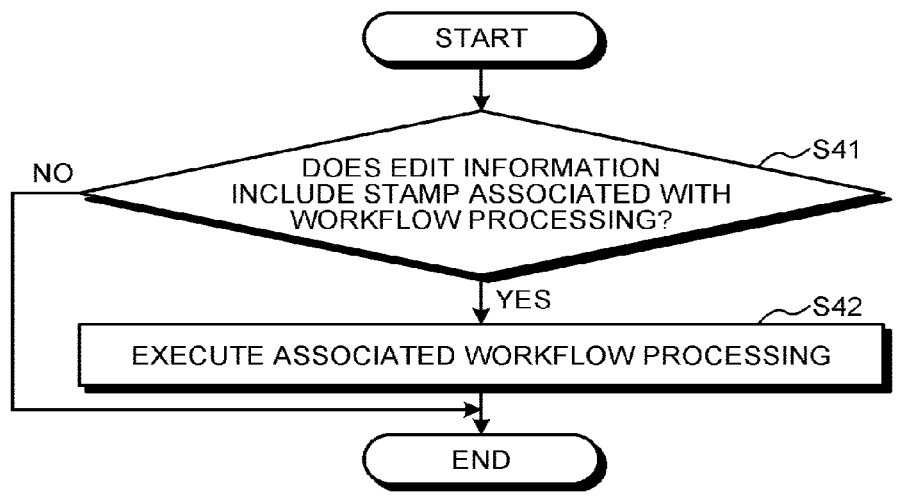
FIG. 28 is a flowchart of an example of a determination method according to the first embodiment.

FIG. 28 is a flowchart of an example of the determination method according to the embodiment. The executing unit 56 determines whether the edit information transmitted from the terminal 10 includes a stamp associated with workflow processing on the basis of the association information (refer to Table 1) in the storage unit 51 (Step S41). If a stamp associated with workflow processing is present (Yes at Step S41), the executing unit 56 executes the workflow processing associated with the stamp (Step S42). If no stamp associated with workflow processing is present (No at Step S41), the processing is ended.

If a setting is made so as not to perform the user confirmation described with reference to FIG. 26, for example, the file server 50 according to the embodiment employs the determination method illustrated in FIG. 28 to perform the workflow processing associated with the stamp.

The following describes an example of the workflow processing according to the embodiment.

Figure 29:
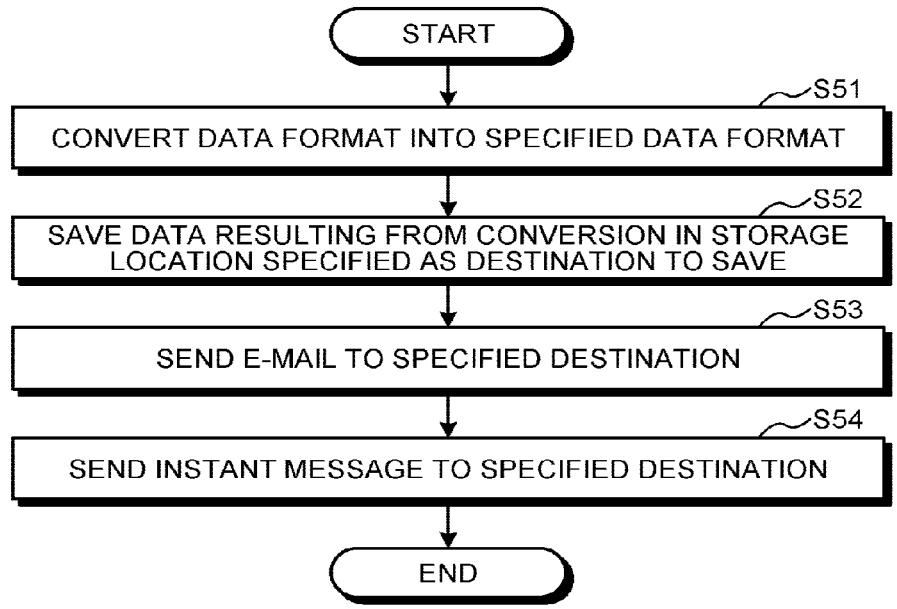
FIG. 29 is a flowchart of an example of the workflow processing (saving) according to the first embodiment.

FIG. 29 is a flowchart of an example of the workflow processing (saving) according to the embodiment. The example in FIG. 29 illustrates the processing of Workflow1. The executing unit 56 converts the data format of data into a data format specified by the workflow setting information on Workflow1 (Step S51). The executing unit 56 saves the data resulting from conversion at Step S51 in a storage location specified as a destination to save by the workflow setting information on Workflow1 via the storage control unit 57 (Step S52). The executing unit 56 sends an e-mail indicating the result of workflow processing to a destination specified by the workflow setting information on Workflow1 via the communication unit 52 (Step S53). The executing unit 56 sends an instant message indicating the result of workflow processing to a destination specified by the workflow setting information on Workflow1 via the communication unit 52 (Step S54).

Figure 30:
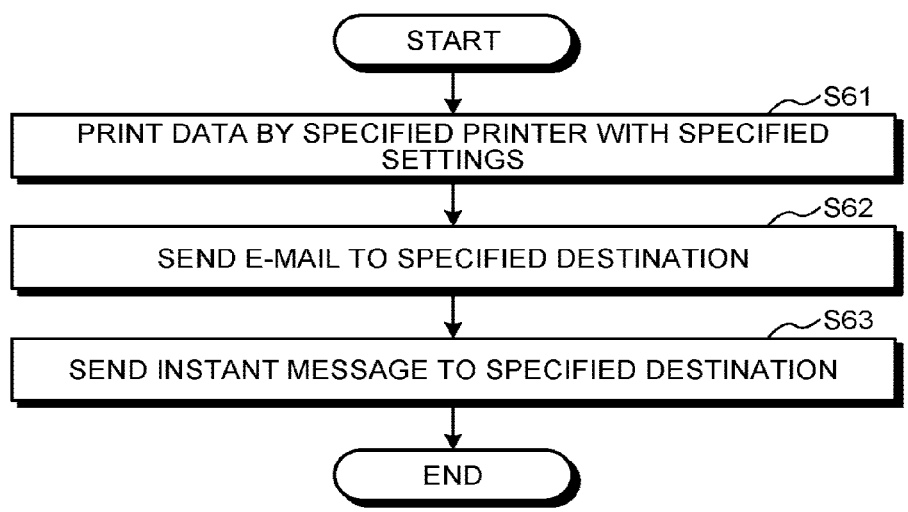
FIG. 30 is a flowchart of an example of the workflow processing (printing) according to the first embodiment.

FIG. 30 is a flowchart of an example of the workflow processing (printing) according to the embodiment. The example in FIG. 30 illustrates the processing of Workflow2. The executing unit 56 causes a printer specified by the workflow setting information on Workflow2 to print data with specified settings (Step S61).

The executing unit 56 sends an e-mail indicating the result of workflow processing to a destination specified by the workflow setting information on Workflow2 via the communication unit 52 (Step S62). The executing unit 56 sends an instant message indicating the result of workflow processing to a destination specified by the workflow setting information on Workflow2 via the communication unit (Step S63).

Figure 31:
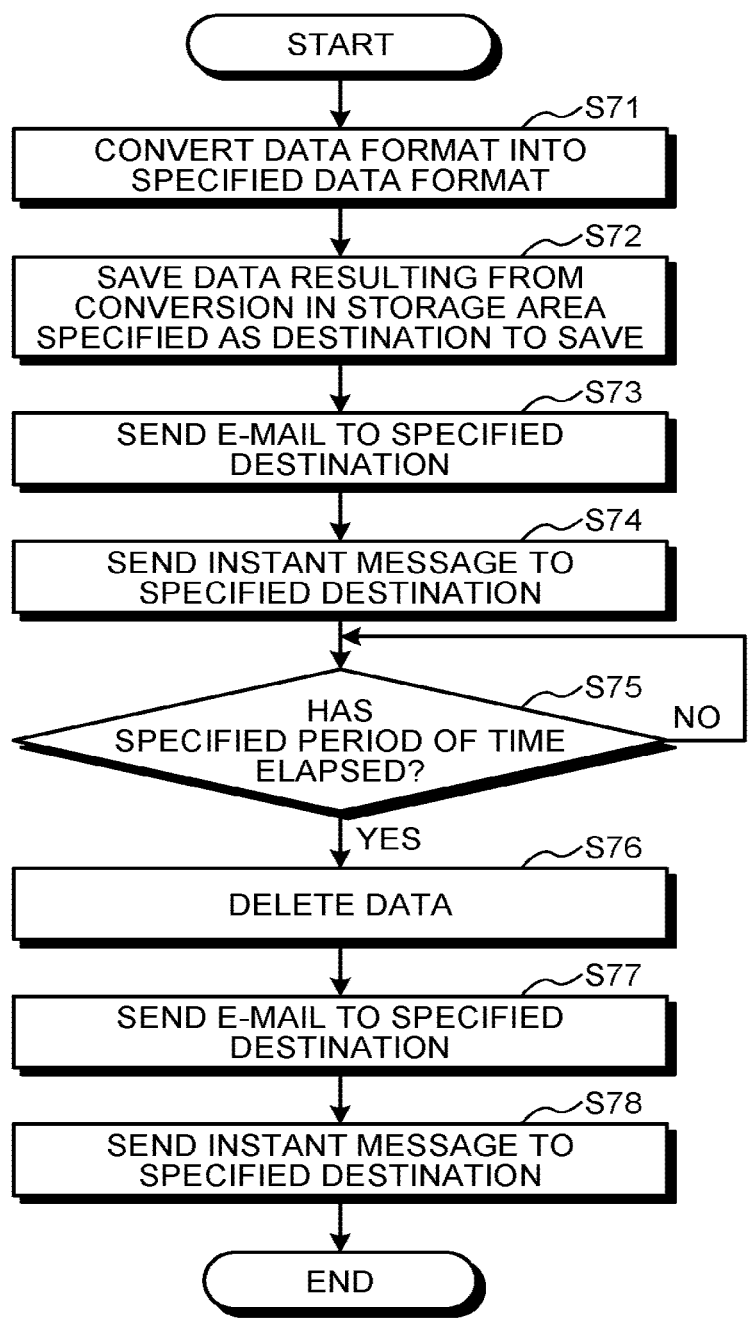
FIG. 31 is a flowchart of an example of the workflow processing (periodic deletion) according to the first embodiment.

FIG. 31 is a flowchart of an example of the workflow processing (periodic deletion) according to the embodiment. The example in FIG. 31 illustrates the processing of Workflow3. The executing unit 56 converts the data format of data into a data format specified by the workflow setting information on Workflow3 (Step S71). The executing unit 56 stores the data resulting from conversion at Step S71 in a storage location specified as a destination to save by the workflow setting information on Workflow3 via the storage control unit 57 (Step S72). The executing unit 56 sends an e-mail indicating that a setting of periodic deletion is made to a destination specified by the workflow setting information on Workflow3 via the communication unit (Step S73). The executing unit 56 sends an instant message indicating that a setting of periodic deletion is made to a destination specified by the workflow setting information on Workflow3 via the communication unit 52 (Step S74).

The executing unit 56 determines whether a period of time (days) specified by the workflow setting information on Workflow3 has elapsed (Step S75). If the specified period of time (days) has not elapsed yet (No at Step S75), the executing unit 56 waits until the specified period of time has elapsed. By contrast, if the specified period of time (days) has elapsed (Yes at Step S75), the executing unit 56 deletes the data via the storage control unit 57 (Step S76).

The executing unit 56 sends an e-mail indicating the result of workflow processing to a destination specified by the workflow setting information on Workflow3 via the communication unit 52 (Step S77). The executing unit 56 sends an instant message indicating the result of workflow processing to a destination specified by the workflow setting information on Workflow3 via the communication unit (Step S78).

Figure 32:
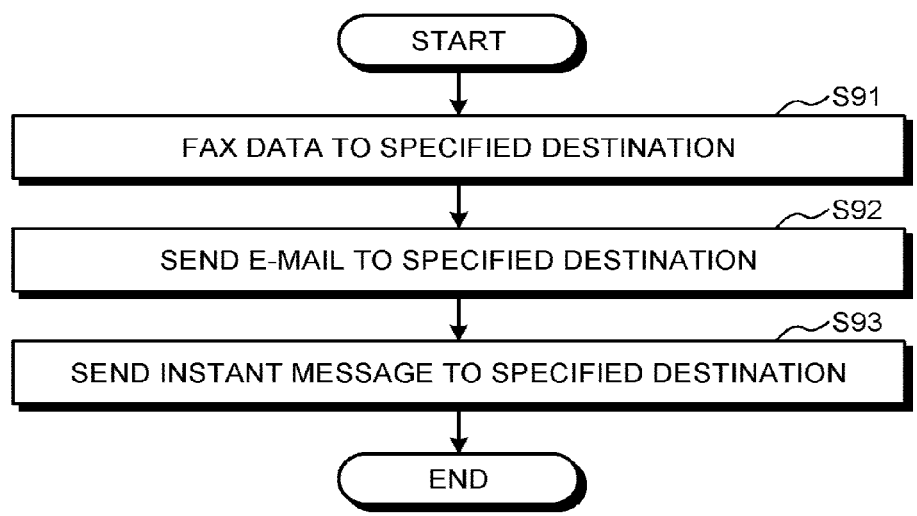
FIG. 32 is a flowchart of an example of the workflow processing (faxing) according to the first embodiment.

FIG. 32 is a flowchart of an example of the workflow processing (faxing) according to the embodiment. The example in FIG. 32 illustrates the processing of Workflow4. The executing unit 56 sends data to a destination specified by the workflow setting information on Workflow4 by a facsimile (Step S91).

The executing unit 56 sends an e-mail indicating the result of workflow processing to a destination specified by the workflow setting information on Workflow4 via the communication unit 52 (Step S92). The executing unit 56 sends an instant message indicating the result of workflow processing to a destination specified by the workflow setting information on Workflow4 via the communication unit (Step S93).

The following describes an exemplary hardware configuration of the terminal 10, the chat server 20, the relay server 30, and the file server 50 according to the embodiment.

Figure 33:
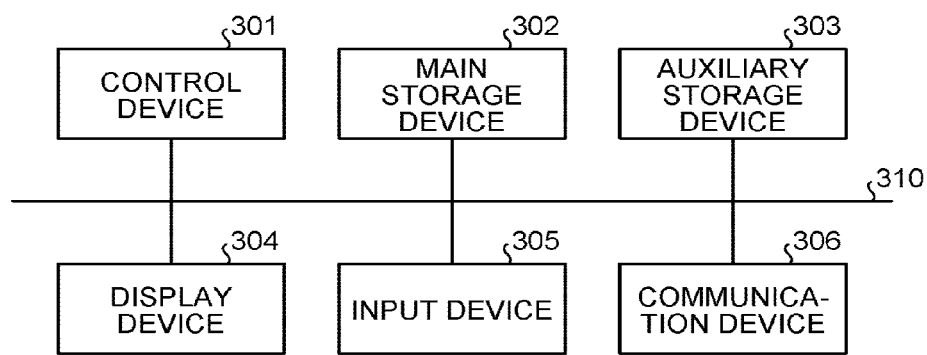
FIG. 33 is a diagram of an exemplary hardware configuration of the terminal, the chat server, the relay server, and the file server according to the first embodiment.

FIG. 33 is a diagram of an exemplary hardware configuration of the terminal 10, the chat server 20, the relay server 30, and the file server 50 according to the embodiment. The terminal 10, the chat server 20, the relay server 30, and the file server 50 according to the embodiment each include a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected to one another via a bus 310.

The control device 301 executes a computer program read from the auxiliary storage device 303 to the main storage device 302. The main storage device 302 is a memory, such as a read only memory (ROM) and a random access memory (RAM). The auxiliary storage device 303 is a memory card, a solid state drive (SSD), and the like.

The display device 304 displays information. The display device 304 is a liquid-crystal display, for example. The input device 305 receives input of information. The input device 305 is a keyboard and a mouse, for example. The display device 304 and the input device 305 may be a liquid-crystal touch panel or the like having both of a display function and an input function. The communication device 306 communicates with other devices.

The computer program executed by the terminal 10, the chat server 20, the relay server 30, and the file server 50 according to the embodiment is stored on a computer-readable storage medium, such as a compact disc read only memory (CD-ROM), a memory card, a compact disc recordable (CD-R), and a digital versatile disc (DVD), as an installable or executable file and is provided as a computer program product.

The computer program executed by the terminal 10, the chat server 20, the relay server 30, and the file server 50 according to the embodiment may be stored in a computer connected to a network, such as the Internet, and downloaded via the network to provide the computer program. Furthermore, the computer program executed by the terminal 10, the chat server 20, the relay server 30, and the file server 50 according to the embodiment may be provided via a network, such as the Internet, without being downloaded.

The computer program executed by the terminal 10, the chat server 20, the relay server 30, and the file server 50 according to the embodiment may be embedded and provided in a ROM, for example.

The computer program executed by the terminal 10, the chat server 20, the relay server 30, and the file server 50 according to the embodiment has a module configuration having functions that can be implemented by the computer program out of the functional configuration of the terminal 10, the chat server 20, the relay server 30, and the file server 50 according to the embodiment above.

The control device 301 reads and executes the computer program from a storage medium, such as the auxiliary storage device 303, to load the functions implemented by the computer program on the main storage device 302. In other words, the functions implemented by the computer program are generated on the main storage device 302.

Part or all of the functions of the terminal 10, the chat server 20, the relay server 30, and the file server 50 according to the embodiment may be provided as hardware, such as an integrated circuit (IC).

As described above, the communication unit 52 of the file server 50 in the information processing system 100 according to the embodiment transmits data and receives data to which an image (stamp) is added from the terminal 10. The executing unit 56 of the file server 50 executes workflow processing associated with the image. The information processing system 100 according to the embodiment thus can cause the image addition function and the workflow function to be made to link.

Second Embodiment

A second embodiment according to the present invention is described below with reference to the configuration of the information processing system 100 illustrated in FIG. 1. The following describes a first aspect and a second aspect in order.

First Aspect

A functional configuration of devices connected to the information processing system 100 is described below. The following describes an exemplary functional configuration of the terminal 10.

Figure 34:
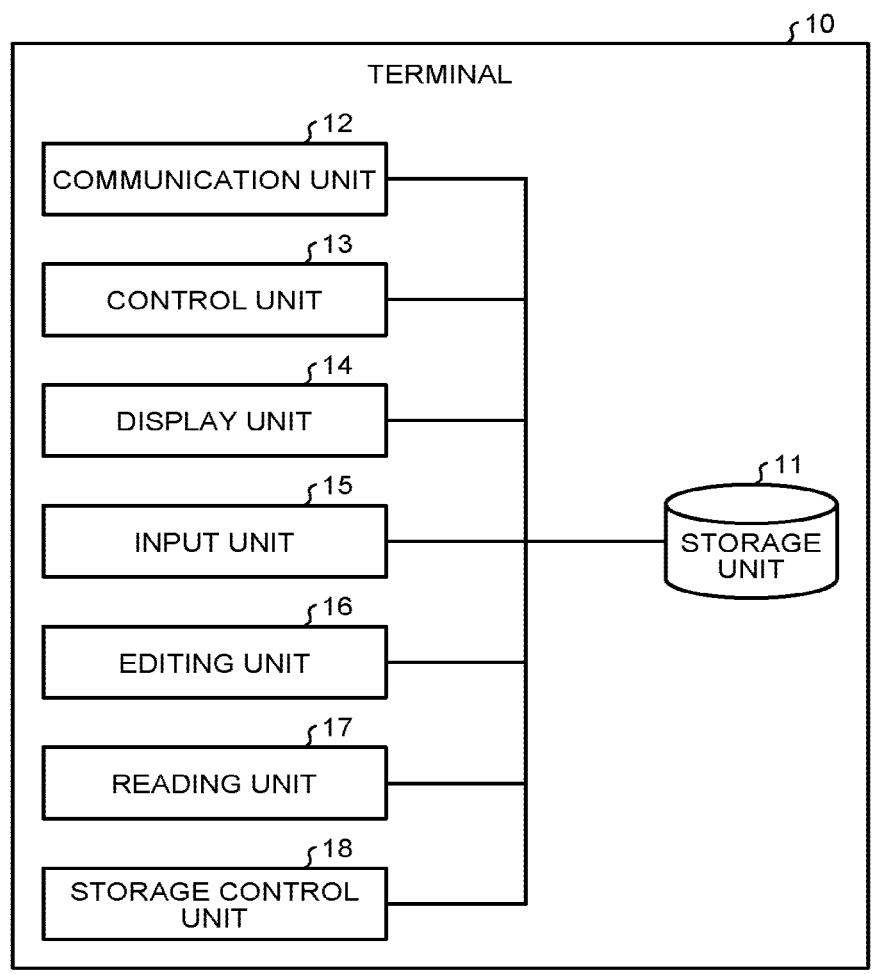
FIG. 34 is a diagram of an exemplary functional configuration of the terminal according to the second embodiment (first aspect)

FIG. 34 is a diagram of an exemplary functional configuration of the terminal 10 according to the second embodiment. The terminal 10 according to the second embodiment includes a storage unit 11, a communication unit 12, a control unit 13, a display unit 14, an input unit 15, an editing unit 16, a reading unit 17, and a storage control unit 18.

The storage unit 11 stores therein information. The information stored in the storage unit 11 is data to be processed acquired from the file server 50, for example. The data to be processed is data created by optional software. The data to be processed is created by word processing software, spreadsheet software, and presentation software, for example.

The communication unit 12 communicates with other devices. The communication unit 12 transmits a request to the file server 50, for example, to the relay server 30. The request includes identification information for identifying the terminal 10 serving as a source, identification information for identifying the file server 50, and information indicating acquisition, addition, change, or deletion of data to be processed, for example.

The communication unit 12, for example, receives data to be processed from the file server 50 via the relay server 30. If an image is added to the data to be processed, the communication unit 12 further receives the image and control data associated with the image.

The image added to the data to be processed is a stamp, for example. In the following description of the first aspect, a stamp is impressed (added) on the data to be processed, for example. The stamp is a for-internal-use-only stamp, a draft stamp, a send-back stamp, and an approved stamp, for example. The for-internal-use-only stamp indicates that the data to be processed is for internal use only. The draft stamp indicates that the contents of the data to be processed are not fixed yet. The send-back stamp indicates that the data to be processed is sent back because of insufficient contents of the data to be processed or other reasons. The approved stamp indicates that the contents of the data to be processed are approved.

When communicating with the file server 50, the communication unit 12 of the terminal 10c connected to the second network 102 directly communicates with the file server 50 not via the relay server 30.

A stamp impressed on the data to be processed and control data associated with the stamp are transmitted from the file server 50 to the terminal 10 as stamp data including an image indicating the stamp and the control data, for example.

If a stamp is impressed on the data to be processed, the control unit 13 controls processing to the data to be processed, on the basis of the control data associated with the stamp.

The following describes an example of the stamp data including a stamp and control data. The data format of the stamp data is a Key/Value format (Json format), for example. Table 2 indicates an example of the stamp data according to the first aspect.

TABLE 2

| Key | Must/Want |
| --- | --- |
| image | Must |
| id | Must |
| access_by_remote | Want |
| open_message | Want |
| save_message | Want |
| available_stamp | Want |
| exclusive_stamp | Want |
| editable | Want |

The stamp data according to the first aspect includes image, id, access_by_remote, open_message, save_message, available_stamp, exclusive_stamp, and editable. "image" and "id" are data indicating an image of a stamp. "access_by_remote", "open_message", "save_message", "available_stamp", "exclusive_stamp", and "editable" are control data.

"Must" in Table 2 indicates a key that must be included in the stamp data. "Want" in Table 2 indicates a key that is not necessarily included in the stamp data.

"image" is a character string obtained by performing base 64 encoding on binary data indicating an image of the stamp. "id" is identification information for identifying the stamp.

"access_by_remote" is set to True or False. True indicates that access to the data to be processed in the file server 50 via the relay server 30 is permitted. In other words, True indicates that the terminal 10a and the terminal 10b connected to the first network 101 are permitted to access the data to be processed in the file server 50. False indicates that access to the data to be processed in the file server 50 via the relay server 30 is not permitted. In other words, False indicates that the terminal 10a and the terminal 10b connected to the first network 101 are not permitted to access the data to be processed in the file server 50. "access_by_remote" is referred to by the file server 50, for example.

If "access_by_remote" is not included in the control data, a default setting is used. The default setting is True, for example.

"open_message" indicates a message to be displayed when the data to be processed is displayed. When displaying, on the display unit 14, data to be processed provided with an image associated with control data including "open_message", the control unit 13 displays the message.

"save_message" indicates a message to be displayed when the data to be processed is saved. When saving data to be processed provided with an image associated with control data including "save_message", the control unit 13 displays the message on the display unit 14.

"available_stamp" indicates id of a stamp capable of being simultaneously impressed. When displaying, on the display unit 14, a list of stamps capable of being impressed, the control unit 13 displays, on the display unit 14, stamps identified by id included in "available_stamp" of control data of the stamp already impressed on the data to be processed as the list of stamps capable of being impressed.

In a case where two or more stamps are impressed on the data to be processed, the control unit 13 displays, on the display unit 14, stamps having id included in "available_stamp" of control data of all the stamps as the list of stamps capable of being impressed. Let us assume a case where a stamp having id of stamp11 and a stamp having id of stamp12 are already impressed on data, "available_stamp" of control data associated with stamp11 is {"stamp13", "stamp14", "stamp15"}, and "available_stamp" of control data associated with stamp12 is {"stamp13", "stamp14"}, for example. In this case, a stamp having id of stamp13 and a stamp having id of stamp14 are displayed in the list of stamps capable of being impressed.

If "available_stamp" is not included in the control data, a default setting is used. The default setting is that all the types of stamps registered in the file server 50 can be further impressed, for example.

"exclusive_stamp" indicates id of a stamp in an exclusive relationship incapable of being simultaneously displayed with another stamp.

Let us assume a case where a stamp having id of stamp21 and a stamp having id of stamp22 are in an exclusive relationship, for example. In this case, "exclusive_stamp" of control data associated with stamp21 includes stamp22, and "exclusive_stamp" of control data associated with stamp22 includes stamp21.

In a case where "exclusive_stamp" of control data of a stamp newly impressed on data to be processed includes id of a stamp already impressed on the data to be processed, the control unit 13 displays the newly impressed stamp on the data to be processed instead of the already impressed stamp.

If "exclusive_stamp" is not included in the control data, a default setting is used. The default setting is that all the types of stamps registered in the file server 50 can be simultaneously displayed, for example.

"editable" is set to True or False. True indicates that the data to be processed is capable of being edited. False indicates that the data to be processed is incapable of being edited. When displaying, on the display unit 14, data to be processed provided with an image associated with control data having True in "editable", the control unit 13 displays a UI used to edit the data to be processed. The UI used to edit the data to be processed is an edit toolbar, for example. By contrast, when displaying, on the display unit 14, data to be processed provided with an image associated with control data having False in "editable", the control unit 13 displays no UI used to edit the data to be processed.

If "editable" is not included in the control data, a default setting is used. The default setting is True, for example.

The following describes a setting example of the stamp data.

FIG. 35A is a diagram of an example of the stamp data (for-internal-use-only stamp) according to the first aspect. In the example illustrated in FIG. 35A, data indicating an image of the stamp includes "image" and "id", and control data includes "access_by_remote" and "open_message".

"image" is a character string obtained by performing base 64 encoding on binary data indicating the image of the for-internal-use-only stamp. "id" is stamp1 for identifying the for-internal-use-only stamp.

"access_by_remote" is False. With this setting, the file server 50 (control unit 44, which will be described later) prevents the terminal 10 from accessing data to be processed on which the for-internal-use-only stamp is impressed via the relay server 30. "open_message" is "Information for internal use only. Handle with care". With this setting, the control unit 13 displays "Information for internal use only. Handle with care." when displaying, on the display unit 14, the data to be processed on which the for-internal-use-only stamp is impressed.

FIG. 35B is a diagram of an example of the stamp data (draft stamp) according to the first aspect. In the example illustrated in FIG. 35B, data indicating an image of the stamp includes "image" and "id", and control data includes "available_stamp" and "exclusive_stamp".

"image" is a character string obtained by performing base 64 encoding on binary data indicating the image of the draft stamp. "id" is stamp1 for identifying the draft stamp.

"available_stamp" includes stamp1, stamp3, and stamp4. With this setting, if the draft stamp is already impressed on data to be processed, the control unit 13 displays, on the display unit 14, the for-internal-use-only stamp identified by stamp1, the send-back stamp identified by stamp3, and the approved stamp identified by stamp4 as a list of stamps capable of being impressed.

"exclusive_stamp" includes stamp3 and stamp4. With this setting, if the send-back stamp identified by stamp3 and the approved stamp identified by stamp4 are already impressed on data to be processed when the draft stamp is impressed on the data to be processed, the control unit 13 impresses the draft stamp instead of the send-back stamp or the approved stamp.

FIG. 35C is a diagram of an example of the stamp data (send-back stamp) according to the first aspect. In the example illustrated in FIG. 35C, data indicating an image of the stamp includes "image" and "id", and control data includes "exclusive_stamp".

"image" is a character string obtained by performing base 64 encoding on binary data indicating the image of the send-back stamp. "id" is stamp3 for identifying the send-back stamp.

"exclusive_stamp" includes stamp2 and stamp4. With this setting, if the draft stamp identified by stamp2 and the approved stamp identified by stamp4 are already impressed on data to be processed when the send-back stamp is impressed on the data to be processed, the control unit 13 impresses the send-back stamp instead of the draft stamp or the approved stamp.

FIG. 35D is a diagram of an example of the stamp data (approved stamp) according to the first aspect. In the example illustrated in FIG. 35D, data indicating an image of the stamp includes "image" and "id", and control data includes "editable", "save_message", and "exclusive_stamp".

"image" is a character string obtained by performing base 64 encoding on binary data indicating the image of the approved stamp. "id" is stamp4 for identifying the approved stamp.

"editable" is False. With this setting, when displaying data to be processed on which the approved stamp is impressed on the display unit 14, the control unit 13 displays no UI used to edit the data to be processed.

"save_message" is "editing will be disabled". With this setting, when saving the data to be processed on which the approved stamp is impressed, the control unit 13 displays "editing will be disabled".

"exclusive_stamp" includes stamp2 and stamp3. With this setting, if the draft stamp identified by stamp2 and the send-back stamp identified by stamp3 are already impressed on the data to be processed when the approved stamp is impressed on the data to be processed, the control unit 13 impresses the approved stamp instead of the draft stamp or the send-back stamp.

Referring back to FIG. 34, the display unit 14 displays information. The display unit 14 displays a selection screen of data to be processed (refer to FIG. 20) and a display screen of data to be processed (refer to FIG. 39 and FIG. 45, which will be described later), for example. If a stamp is impressed on data to be processed when the data to be processed is displayed, the display unit 14 also displays the stamp.

The input unit 15 receives input of information from a user. The editing unit 16 edits data to be processed. The reading unit 17 reads information. The reading unit 17 is an image-capturing device (camera) that reads a two-dimensional code, for example. The storage control unit 18 adds, changes or deletes data to be processed stored in the storage unit 11.

An exemplary functional configuration of the relay server 30 is the same as illustrated in FIG. 4 and the overlapping explanation is therefore omitted.

Figure 36:
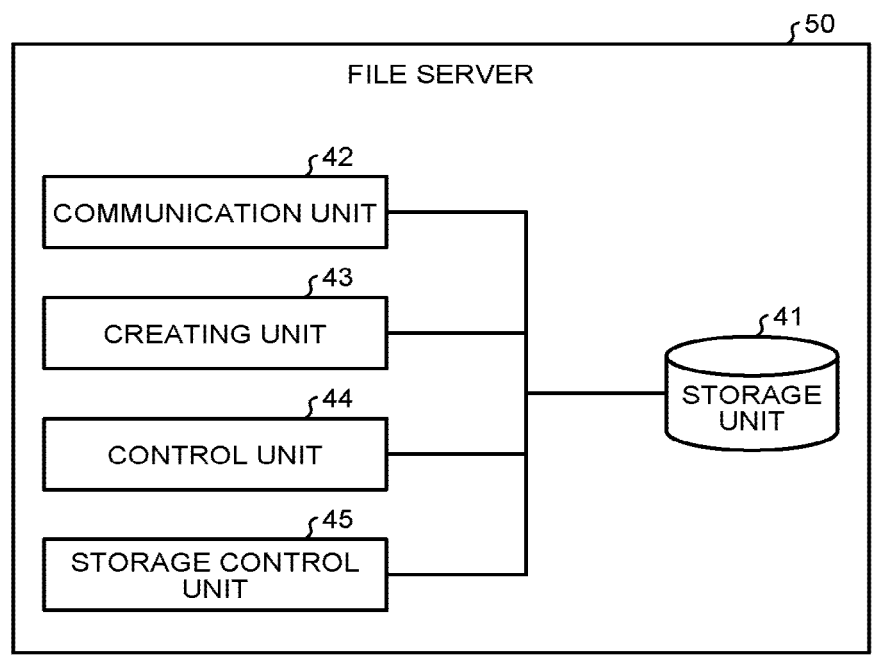
FIG. 36 is a diagram of an exemplary functional configuration of the file server according to the second embodiment (first aspect)

FIG. 36 is a diagram of an exemplary functional configuration of the file server 50 according to the first aspect. The file server 50 according to the first aspect includes a storage unit 41, a communication unit 42, a creating unit 43, a control unit 44, and a storage control unit 45.

The storage unit 41 stores therein information. The information stored in the storage unit 41 is data to be processed, user data, and stamp data, for example.

The data to be processed is stored in association with a stamp already impressed on the data to be processed. The method for associating the data to be processed and the stamp may be any method.

The stamp already impressed on the data to be processed may be associated as image data having a layer data structure on the data to be processed, for example. In this case, a layer 0 may correspond to the data to be processed, a layer 1 may correspond to the for-internal-use-only stamp, a layer 2 may correspond to the draft stamp, a layer 3 may correspond to the send-back stamp, and a layer 4 may correspond to the approved stamp, for example.

The stamp already impressed on the data to be processed may be associated with the data by display position information indicating the display position on the data to be processed, for example. The display position information includes a page of the data to be processed, a position on the data to be processed, and the size of the stamp, for example.

The user data includes identification information for identifying a user and specification information for specifying the terminal 10 used by the user, for example. Explanation of the stamp data is the same as described above and is therefore omitted.

The creating unit 43 creates stamp data in which an image of a stamp is associated with control data. The creating unit 43 creates the stamp data on the basis of information received via a creation screen used to create the stamp data, for example. The stamp data may be created by the file server 50 reading a setting file or the like including the stamp data.

Figure 37:
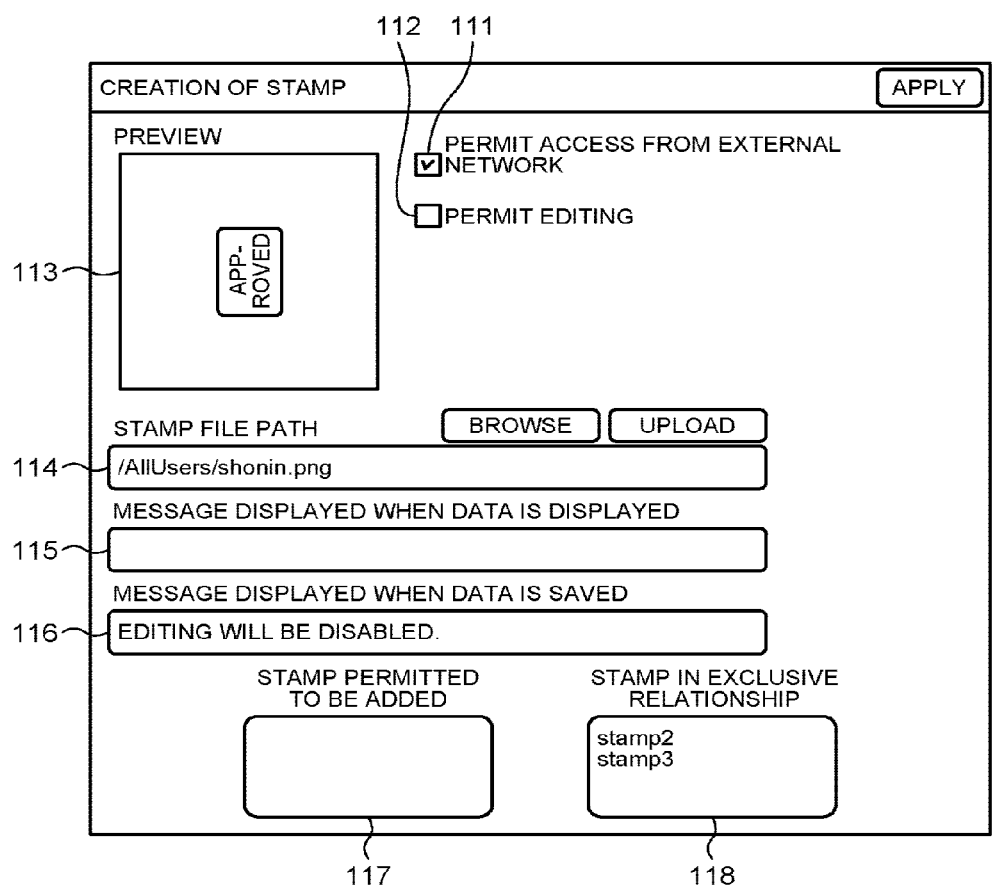
FIG. 37 is a diagram of an example of the creation screen according to the second embodiment (first aspect)

FIG. 37 is a diagram of an example of the creation screen according to the first aspect. In the example illustrated in FIG. 37, a browser or the like of the terminal 10 displays the creation screen for a stamp as a web UI. FIG. 37 illustrates an input example of creating stamp data of the approved stamp (refer to FIG. 35D).

If a check mark is placed in a check box 111, "access_by_remote" of the stamp data is set to True. If no check mark is placed in the check box 111, "access_by_remote" is set to False.

If a check mark is placed in a check box 112, "editable" of the stamp data is set to True. If no check mark is placed in the check box 112, "editable" is set to False.

A preview section 113 displays a preview of data specified in a stamp file path specification section 114. The stamp file path specification section 114 indicates a storage location of data used as a stamp.

If a message is input to an input section 115, the message is set in "open_message" of the stamp data. If a message is input to an input section 116, the message is set in "save_message" of the stamp data.

If id is input to an input section 117, the id is set in "available_stamp" of the stamp data. If id is input to an input section 118, the id is set in "exclusive_stamp" of the stamp data.

Referring back to FIG. 36, the control unit 44 controls processing to data to be processed, on the basis of the control data associated with the stamp impressed on the data to be processed. If the control unit 44 receives, via the communication unit 42, a request to acquire data indicating a list of data to be processed from the terminal 10a and terminal 10b connected to the first network 101, for example, the control unit 44 performs control such that a response to the request does not include data to be processed provided with a stamp associated with stamp data having "access_by_remote" set to False.

The storage control unit 45 adds, changes or deletes data stored in the storage unit 41.

The following describes an example of an information processing method according to the first aspect.

The first aspect performs pairing (device registration) of the terminal 10 and the file server 50 before establishing communications between the terminal 10 and the file server 50. The file server 50 according to the first aspect establishes communications with a registered terminal 10 and does not establish communications with a non-registered terminal 10.

An example of the method for pairing the terminal 10 and the file server 50 is the same as illustrated in FIG. 11 and the Overlapping explanation is therefore omitted.

An example of the reading screen according to the first aspect is the same as illustrated in FIG. 12. The reading screen is displayed on the terminal 10 when the reading unit 17 of the terminal 10 reads a QR code (registered trademark) as a two-dimensional code. An example of the QR code (registered trademark) serving as a two-dimensional code is the same as illustrated in FIG. 13A. An example of the access information is the same as illustrated in FIG. 13B. An example of the success screen is the same as illustrated in FIG. 14.

The following describes an example of a control method according to the first aspect.

Figure 38:
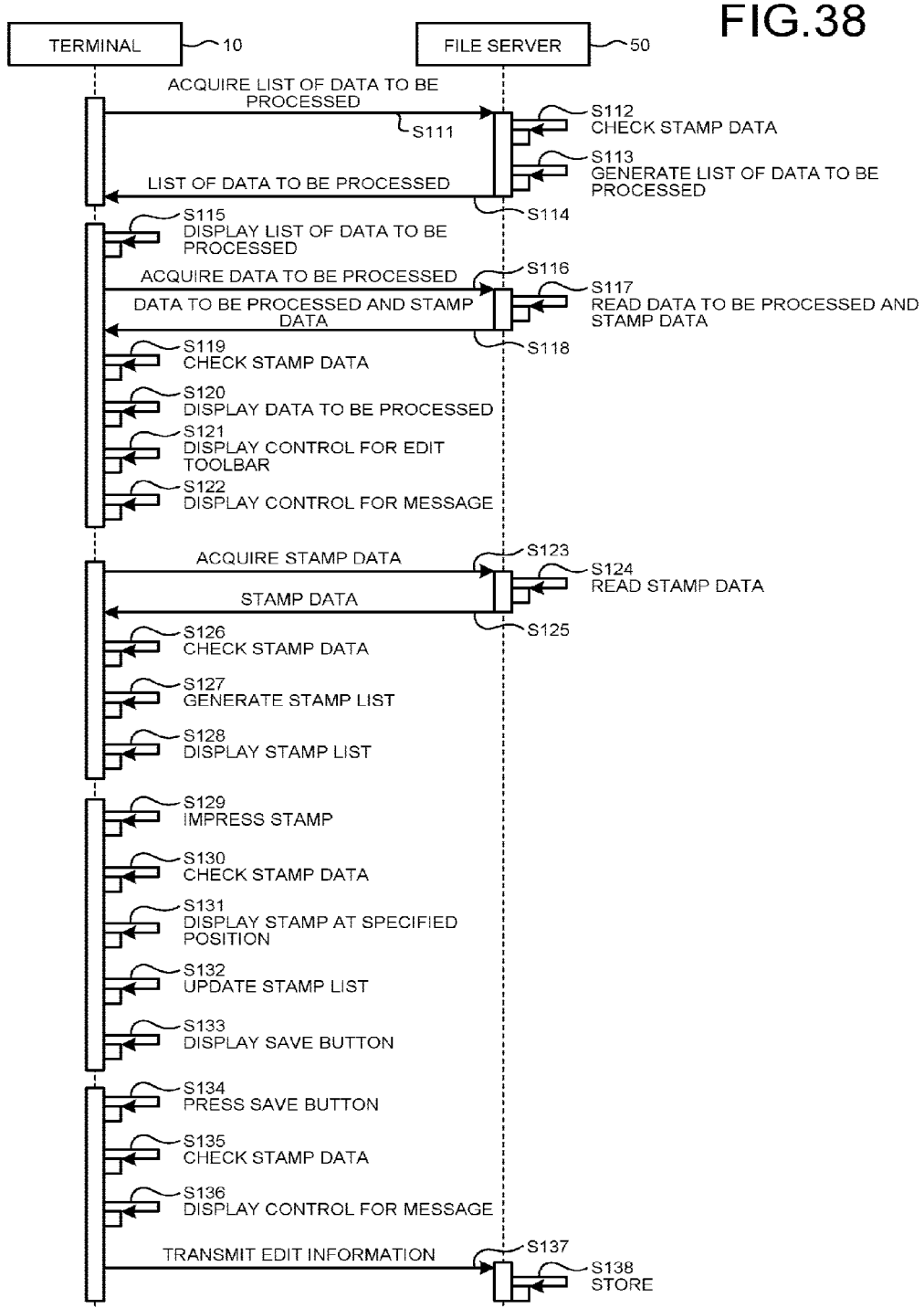
FIG. 38 is a sequence diagram of an example of a control method according to the second embodiment (first aspect)

FIG. 38 is a sequence diagram of an example of the control method according to the first aspect. In the example illustrated in FIG. 38, the relay server 30 is not illustrated because the relay server 30 performs no processing other than relaying the communications between the terminal 10 and the file server 50.

The communication unit 12 of the terminal 10 transmits, to the file server 50, a request to acquire a list of data to be processed to be displayed on the data selection screen (Step S111).

The control unit 44 of the file server 50 checks stamp data (refer to Table 2) of a stamp already impressed on the data to be processed stored in the storage unit 41 (Step S112).

The control unit 44 of the file server 50 generates information indicating the list of data to be processed on the basis of the stamp data (Step S113). Specifically, if the control unit 44 receives a request at Step S111 from the terminal 10a and the terminal 10b connected to the first network 101, for example, the control unit 44 does not enter data to be processed provided with a stamp associated with stamp data having "access_by_remote" set to False in the list of data to be processed. The information indicating the list of data to be processed is a list of names of data to be processed, for example.

The communication unit 42 of the file server 50 transmits the information indicating the list of data to be processed to the terminal 10 (Step S114). The display unit 14 of the terminal 10 displays the selection screen of the data to be processed including the information indicating the list of the data to be processed (Step S115).

An example of the selection screen of the data to be processed is the same as illustrated in FIG. 20.

Referring back to FIG. 38, if the input unit 15 of the terminal 10 receives a pressing of a select button when data to be processed is selected from the list of data to be processed, the communication unit 12 transmits a request to acquire the data to be processed to the file server 50 (Step S116).

If the communication unit 42 of the file server receives the request transmitted at Step S116, the storage control unit 45 of the file server 50 reads, from the storage unit 41, the data to be processed specified by the request and stamp data of a stamp already impressed on the data to be processed (Step S117). The communication unit 42 of the file server 50 transmits, to the terminal 10, the data to be processed and the stamp data read from the storage unit 41 at Step S117 (Step S118). If no stamp is already impressed on the data to be processed, no stamp data is transmitted at Step S118.

The control unit 13 of the terminal 10 checks the stamp data of the stamp already impressed on the data to be processed transmitted at Step S118 (Step S119).

The display unit 14 of the terminal 10 displays the display screen of data to be processed including the data to be processed transmitted at Step S118 (Step S120). If a stamp is already impressed on the data to be processed to be displayed, the control unit 13 of the terminal 10 displays the stamp on the display unit 14.

The control unit 13 of the terminal 10 performs control to display the edit toolbar (Step S121). Specifically, if "editable" of the stamp data associated with the stamp impressed on the data to be processed is not False, for example, the control unit 13 of the terminal 10 displays the edit toolbar on the display unit 14. Furthermore, if no stamp is impressed on the data to be processed, for example, the control unit 13 of the terminal 10 displays the edit toolbar on the display unit 14.

The control unit 13 of the terminal 10 performs control to display a message to be displayed when the data to be processed is displayed (Step S122). Specifically, if "open_message" of the stamp data associated with the stamp impressed on the data to be processed includes a message, the control unit 13 of the terminal 10 displays the message on the display unit 14.

Figure 39:
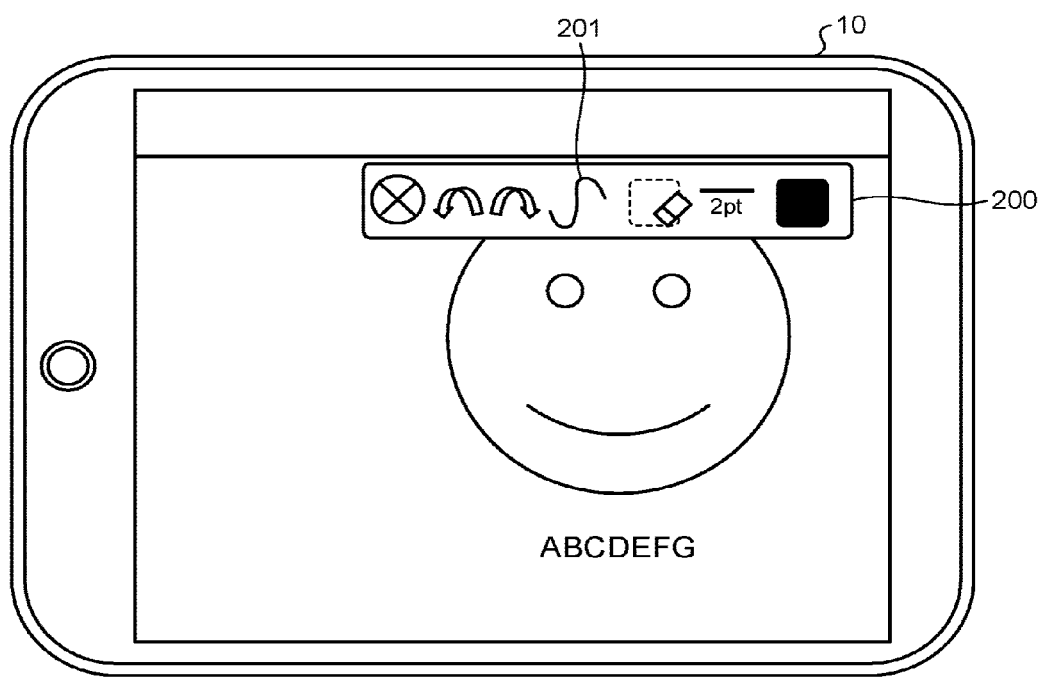
FIG. 39 is a diagram of an example of a display screen of data to be processed (capable of being edited) according to the second embodiment (first aspect)

FIG. 39 is a diagram of an example of the display screen of data to be processed (capable of being edited) according to the first aspect. In the example illustrated in FIG. 39, no stamp is impressed on the data to be processed. In the example illustrated in FIG. 39, the edit toolbar 200 is displayed on the data to be processed. The symbol 201 indicates a mode to add a line to the data to be processed. When the symbol 201 is displayed in the edit toolbar 200, the current edit mode is a mode to add a line to the data to be processed. If the symbol 201 in the edit toolbar 200 is pressed, the display screen of data to be processed is shifted to the screen illustrated in FIG. 40.

Figure 40:
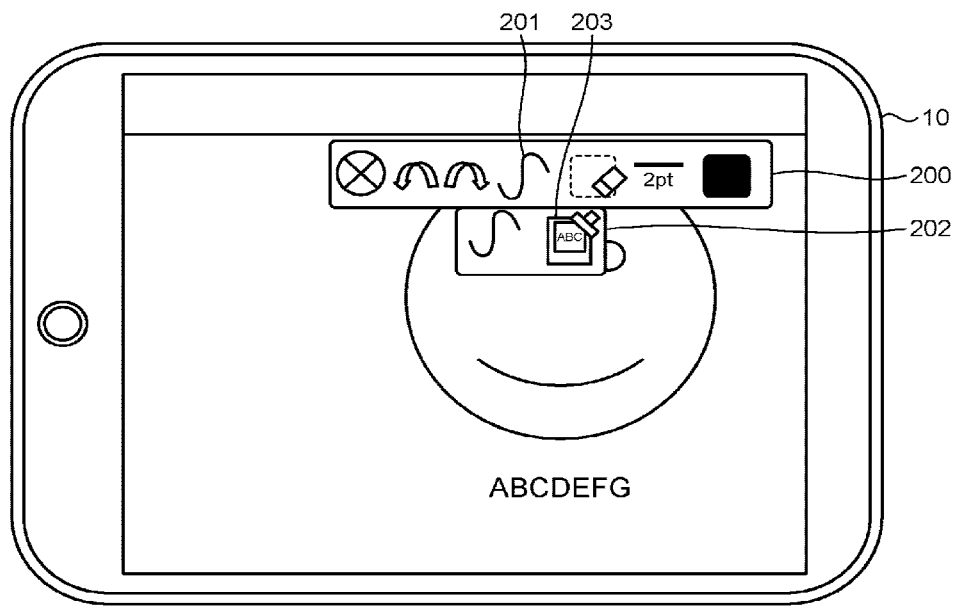
FIG. 40 is a diagram of a transition example of an edit toolbar according to the second embodiment (first aspect)

FIG. 40 is a diagram of a transition example of the edit toolbar 200 according to the first aspect. In the example illustrated in FIG. 40, the symbol 201 in the toolbar 200 is pressed, whereby the selection toolbar 202 is displayed. The selection toolbar 202 includes the symbol 201 and the symbol 203. The symbol 203 indicates a mode to impress a stamp on data to be processed. If the symbol 203 in the selection toolbar 202 is pressed, the display unit 14 of the terminal 10 displays a stamp acquisition screen.

Figure 41:
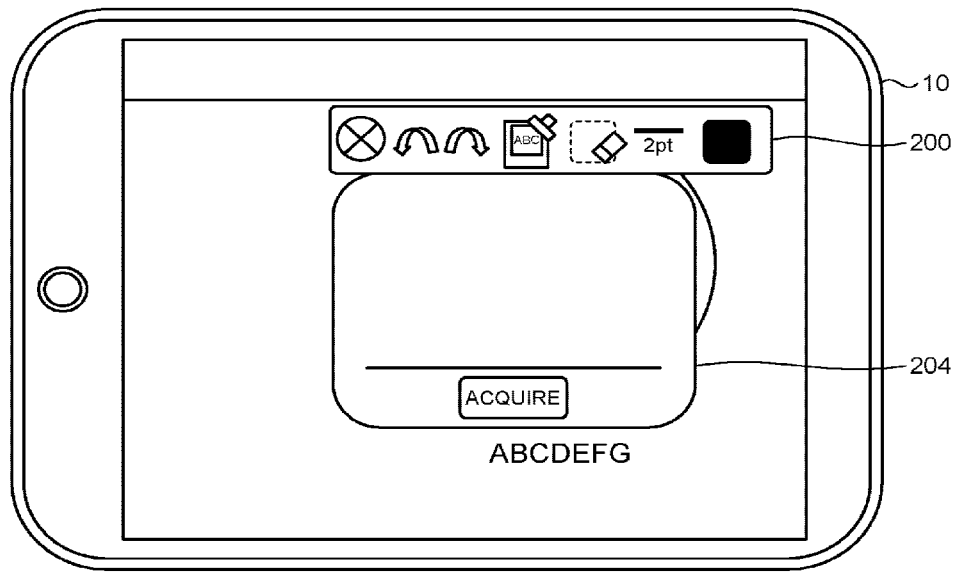
FIG. 41 is a diagram of an example of a stamp acquisition screen according to the second embodiment (first aspect)

FIG. 41 is a diagram of an example of the stamp acquisition screen according to the first aspect. In the example illustrated in FIG. 41, a window 204 used to acquire a stamp is displayed.

Referring back to FIG. 38, if the input unit 15 of the terminal 10 receives a pressing of an acquire button in the window 204 (refer to FIG. 41), the communication unit 12 of the terminal 10 transmits a request to acquire stamp data to the file server 50 (Step S123). If the communication unit 42 of the file server 50 receives the request transmitted at Step S123, the storage control unit 45 of the file server 50 reads the stamp data specified by the request from the storage unit 41 (Step S124). The communication unit 42 of the file server 50 transmits, to the terminal 10, the stamp data read from the storage unit 41 at Step S124 (Step S125).

When the communication unit 12 of the terminal 10 receives the stamp data transmitted at Step S125, the control unit 13 of the terminal 10 checks the stamp data (Step S126). Specifically, the control unit 13 of the terminal 10 checks whether there is a stamp identified by id included in "available_stamp" of the stamp data of the stamp already impressed on the data to be processed.

The control unit 13 of the terminal 10 generates a stamp list to be displayed in the window 204 after the acquire button in the window 204 is pressed (Step S127). Specifically, the control unit 13 of the terminal 10 generates the stamp list on the basis of the stamps identified by id included in "available_stamp" of the stamp data of the stamp already impressed on the data to be processed.

The control unit 13 of the terminal 10 displays the stamp selection screen including the stamp list generated at Step S127 on the display unit 14 (Step S128).

Figure 42:
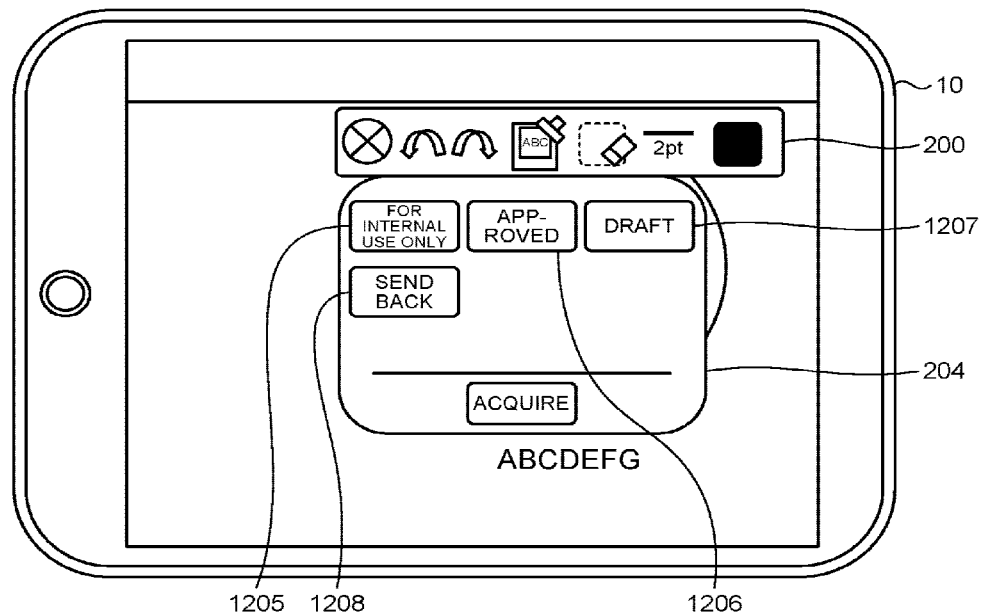
FIG. 42 is a diagram of an example of a stamp selection screen (with no restriction) according to the second embodiment (first aspect)

FIG. 42 is a diagram of an example of the stamp selection screen (with no restriction) according to the first aspect. In the example illustrated in FIG. 42, the window 204 includes a for-internal-use-only stamp 1205, an approved stamp 1206, a draft stamp 1207, and a send-back stamp 1208 as a list of stamps that can be selected by the user.

Referring back to FIG. 38, the input unit 15 of the terminal 10 receives input of impressing a stamp at a specified position on the data to be processed (Step S129).

The control unit 13 of the terminal 10 checks the stamp data of the stamp impressed on the data to be processed (Step S130). Specifically, the control unit 13 of the terminal 10 checks whether a stamp identified by id included in "exclusive_stamp" of the stamp data of the stamp impressed on the data to be processed at Step S129 is already impressed on the data to be processed. The control unit 13 of the terminal 10 also checks "available_stamp" of the stamp data of the stamp impressed on the data to be processed at Step S129 and "available_stamp" of the stamp data of the stamp already impressed on the data to be processed.

The control unit 13 of the terminal 10 displays the stamp at the position specified by the input at Step S129 (Step S131). At this time, the control unit 13 of the terminal 10 deletes, from the data to be processed, a stamp identified by id included in "exclusive_stamp" of the stamp data of the stamp impressed on the data to be processed at Step S129.

The control unit 13 of the terminal 10 updates the stamp list (Step S132). Specifically, the control unit 13 of the terminal 10 generates a stamp list including stamps identified by id included both in "available_stamp" of the stamp data of the stamp impressed on the data to be processed at Step S129 and in "available_stamp" of the stamp data of the stamp already impressed on the data to be processed.

If a change is made by the impression of the stamp on the data to be processed, the control unit 13 of the terminal 10 displays a save button on the display unit 14 (Step S133).

Figure 43:
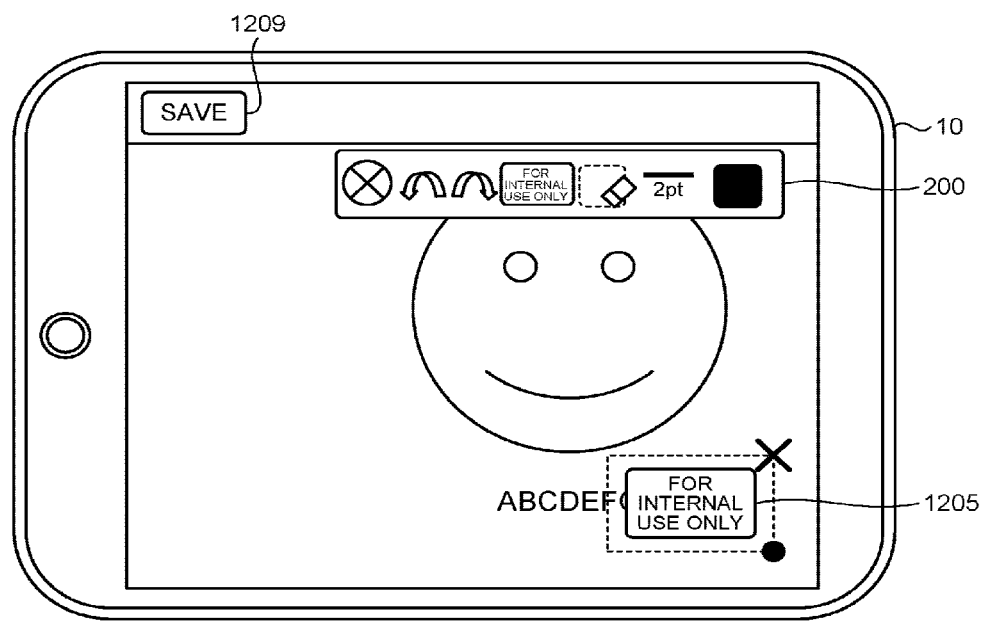
FIG. 43 is a diagram of an example of data on which a stamp is impressed according to the second embodiment (first aspect)

FIG. 43 is a diagram of an example of data on which a stamp is impressed according to the first aspect. In the example illustrated in FIG. 43, the for-internal-use-only stamp 1205 selected on the stamp selection screen is impressed on the data. If the input unit 15 of the terminal 10 receives an operation of pressing the cross button arranged at the upper right of the for-internal-use-only stamp 1205, the control unit 13 of the terminal 10 deletes the for-internal-use-only stamp 1205. If the input unit 15 receives an operation of dragging and dropping the for-internal-use-only stamp 1205, the control unit 13 changes the display position of the for-internal-use-only stamp 1205 in response to the drag-and-drop operation. If the input unit 15 receives an operation of sliding the circle button arranged at the lower right of the for-internal-use-only stamp 1205, the control unit 13 changes the size of the for-internal-use-only stamp 1205 in response to the slide operation.

The control unit 13 of the terminal 10 may add and display additional information to the for-internal-use-only stamp 1205 on the display unit 14. The additional information is a user name and time information, for example. The time information indicates the time and date when the for-internal-use-only stamp 1205 is impressed, for example.

Referring back to FIG. 38, the input unit 15 of the terminal 10 receives a pressing of a save button 1209 (refer to FIG. 43) (Step S134).

The control unit 13 of the terminal 10 checks the stamp data of the stamp impressed on the data to be processed (Step S135). Specifically, the control unit 13 of the terminal 10 checks whether "save_message" of the stamp data associated with the stamp impressed on the data to be processed includes a message.

The control unit 13 of the terminal 10 performs control to display a message to be displayed when the data to be processed is saved (Step S136). Specifically, if "save_message" of the stamp data associated with the stamp impressed on the data to be processed includes a message, the control unit 13 of the terminal 10 displays the message on the display unit 14.

The communication unit 12 of the terminal 10 transmits, to the file server 50, edit information on the data to be processed fixed by a pressing of the save button 1209 (Step S137).

FIG. 44 is a diagram of an example of the edit information according to the first aspect. In the example illustrated in FIG. 44, the data format of the edit information is a Json format. "objects" indicates a drawing object. "page" indicates a page including contents. "contents" indicates a unit of drawing and includes type, top_left, bottom_right, and id. "type" indicates the type of drawing. "top_left" and "bottom_right" indicate a drawing position. "id" indicates identification information on a stamp.

Referring back to FIG. 38, if the communication unit 42 of the file server 50 receives the edit information, the storage control unit 45 of the file server 50 updates and saves the data to be processed in the storage unit 41 on the basis of the edit information (Step S138).

In a case where the approved stamp 1206 is already impressed on the data to be processed, for example, the control unit 13 of the terminal 10 does not display the edit toolbar 200 on the display unit 14 in the processing at Step S121 in FIG. 38.

Figure 45:
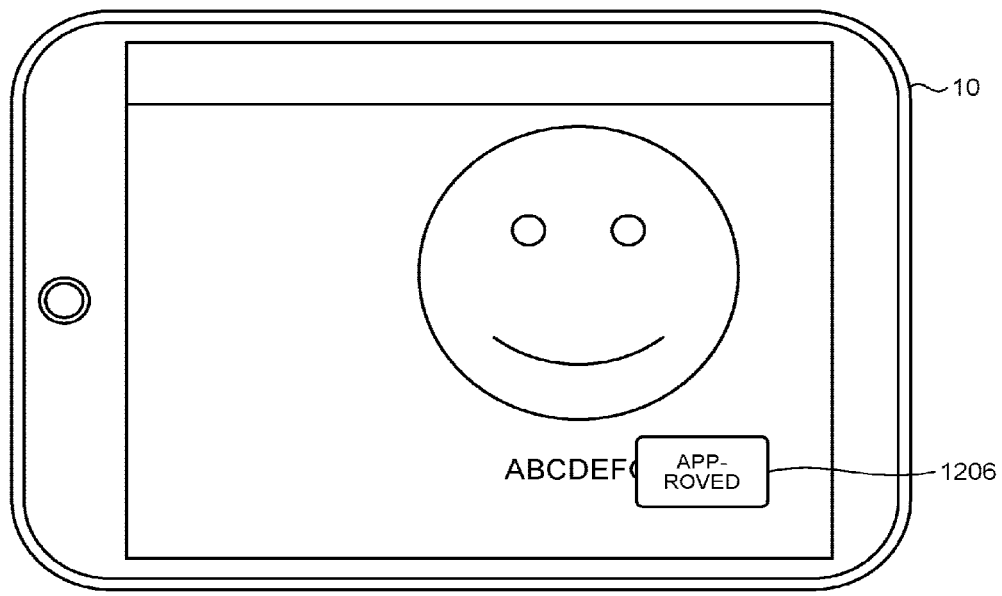
FIG. 45 is a diagram of a display screen of data to be processed (incapable of being edited) according to the second embodiment (first aspect)

FIG. 45 is a diagram of an example of the data to be processed display screen (incapable of being edited) according to the first aspect. In the example illustrated in FIG. 45, the display unit 14 displays data to be processed on which the approved stamp 1206 is already impressed. Because "editable" of the stamp data of the approved stamp 1206 is False, the control unit 13 of the terminal 10 does not display the edit toolbar 200 when displaying the data to be processed on the display unit 14.

When the control unit 13 of the terminal 10 displaying a message at Step S122 and Step S136 in FIG. 38, how to display the message may be arbitrary.

Figure 46:
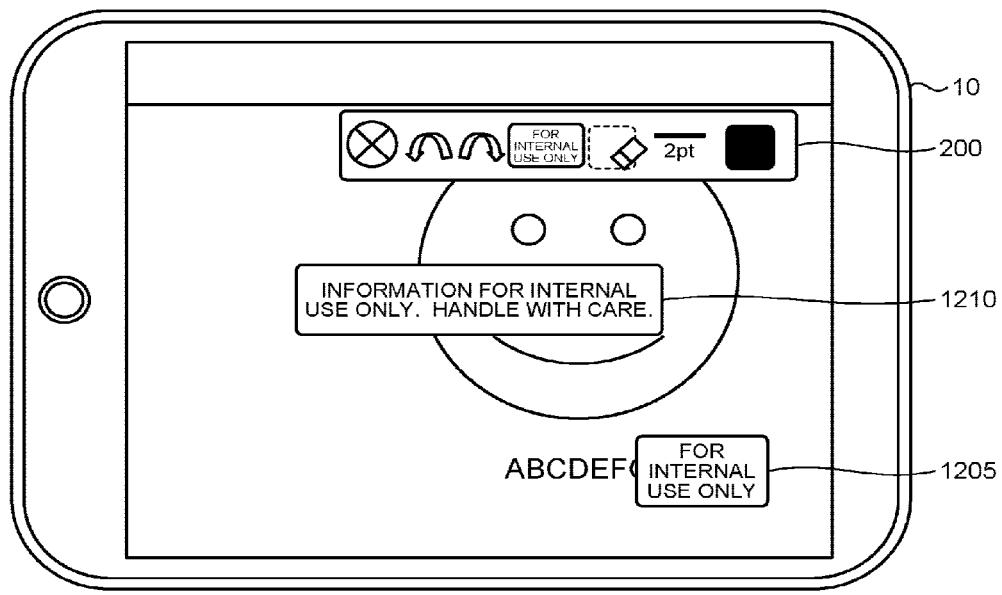
FIG. 46 is a diagram of a display example of a message according to the second embodiment (first aspect)

FIG. 46 is a diagram of a display example of a message according to the first aspect. In the example illustrated in FIG. 46, the control unit 13 of the terminal 10 displays a message 1210 when displaying, on the display unit 14, data on which the for-internal-use-only stamp 1205 is impressed. When a predetermined period of time has elapsed or when the display unit 14 is tapped, for example, the control unit 13 of the terminal 10 deletes the message 1210 from the display unit 14.

The following supplementarily describes a specific example of the processing at Step S128 and Step S131 in FIG. 38.

Figure 47:
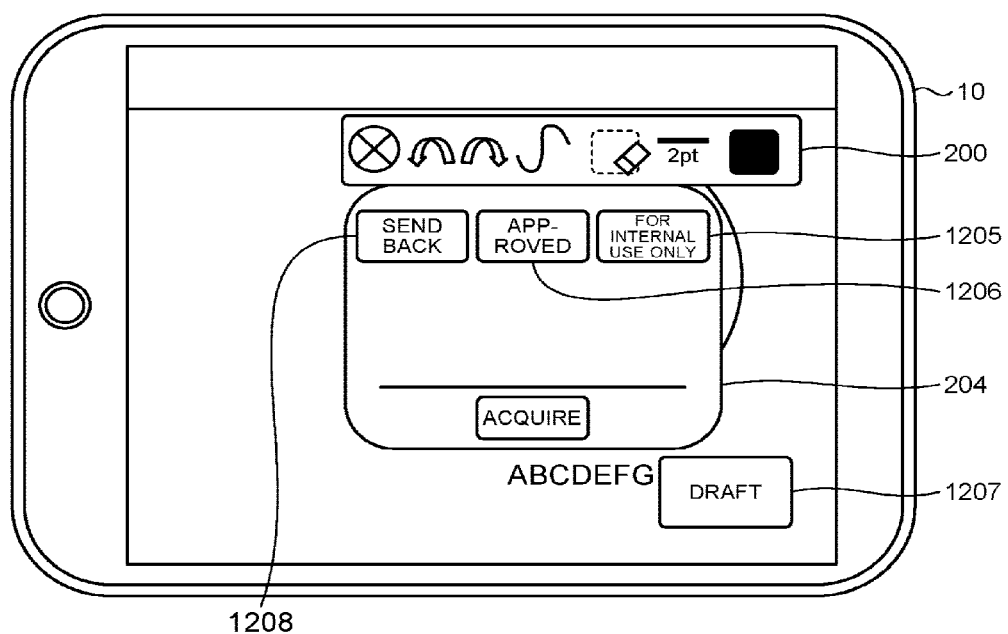
FIG. 47 is a diagram of an example of the stamp selection screen (with a restriction) according to the second embodiment (first aspect)

FIG. 47 is a diagram of an example of the stamp selection screen (with a restriction) according to the first aspect. In the example illustrated in FIG. 47, the draft stamp 1207 is already impressed on the data to be processed. Because "available_stamp" of the stamp data of the draft stamp 1207 does not include id of the draft stamp 1207, the control unit 13 of the terminal 10 does not display the draft stamp 1207 in the window 204. If the approved stamp 1206 in the window 204 is selected in this state, and the approved stamp 1206 is impressed on the data to be processed, the control unit 13 of the terminal 10 deletes the draft stamp 1207 from the data to be processed because "exclusive_stamp" of the stamp data of the approved stamp 1206 includes stamp2 identifying the draft stamp 1207.

As described above, the storage unit 41 of the file server 50 in the information processing system 100 according to the first aspect stores therein data to be processed, one or more stamps, and control data associated with the one or more stamps. If a stamp is impressed (added) on data to be processed, the storage unit 41 stores therein the stamp impressed on the data to be processed in association with the data to be processed. The communication unit 12 of the terminal 10 receives data to be processed from the file server 50. If a stamp is impressed on the data to be processed, the communication unit 12 further receives stamp data including the stamp and control data associated with the stamp. The display unit 14 of the terminal 10 displays data to be processed. If a stamp is impressed on the data to be processed, the display unit 14 further displays the stamp. If a stamp is impressed on the data to be processed, the control unit 13 of the terminal 10 controls processing to the data to be processed, on the basis of the control data. The information processing system 100 according to the first aspect thus can control processing to the data to be processed, on the basis of the stamp impressed on the data to be processed.

Second Aspect

A second aspect is described below. The second aspect describes a case where the processing on the data to be processed performed by the control unit 13 of the terminal 10 is performed by the control unit 44 of the file server 50. In the description of the second aspect, explanation of the same part as the first aspect is omitted, and a part different from the first aspect is explained.

Explanation of the device configuration of the information processing system 100 according to the second aspect is the same as in the first aspect and is therefore omitted.

The terminal 10 according to the second aspect includes the storage unit 11, the communication unit 12, the display unit 14, the input unit 15, the editing unit 16, the reading unit 17, and the storage control unit 18. The terminal 10 according to the second aspect is different from the terminal 10 according to the first aspect in that the terminal 10 according to the first aspect does not include the control unit 13. The storage unit 11, the communication unit 12, the display unit 14, the input unit 15, the editing unit 16, the reading unit 17, and the storage control unit 18 according to the second aspect are the same as the storage unit 11, the communication unit 12, the display unit 14, the input unit 15, the editing unit 16, the reading unit 17, and the storage control unit 18 according to the first aspect, respectively, and the explanation is therefore omitted.

The device configuration of the relay server 30 and the file server 50 according to the second aspect are the same as in the first aspect and the explanation is therefore omitted.

The following describes an example of a control method according to the second aspect.

Figure 48:
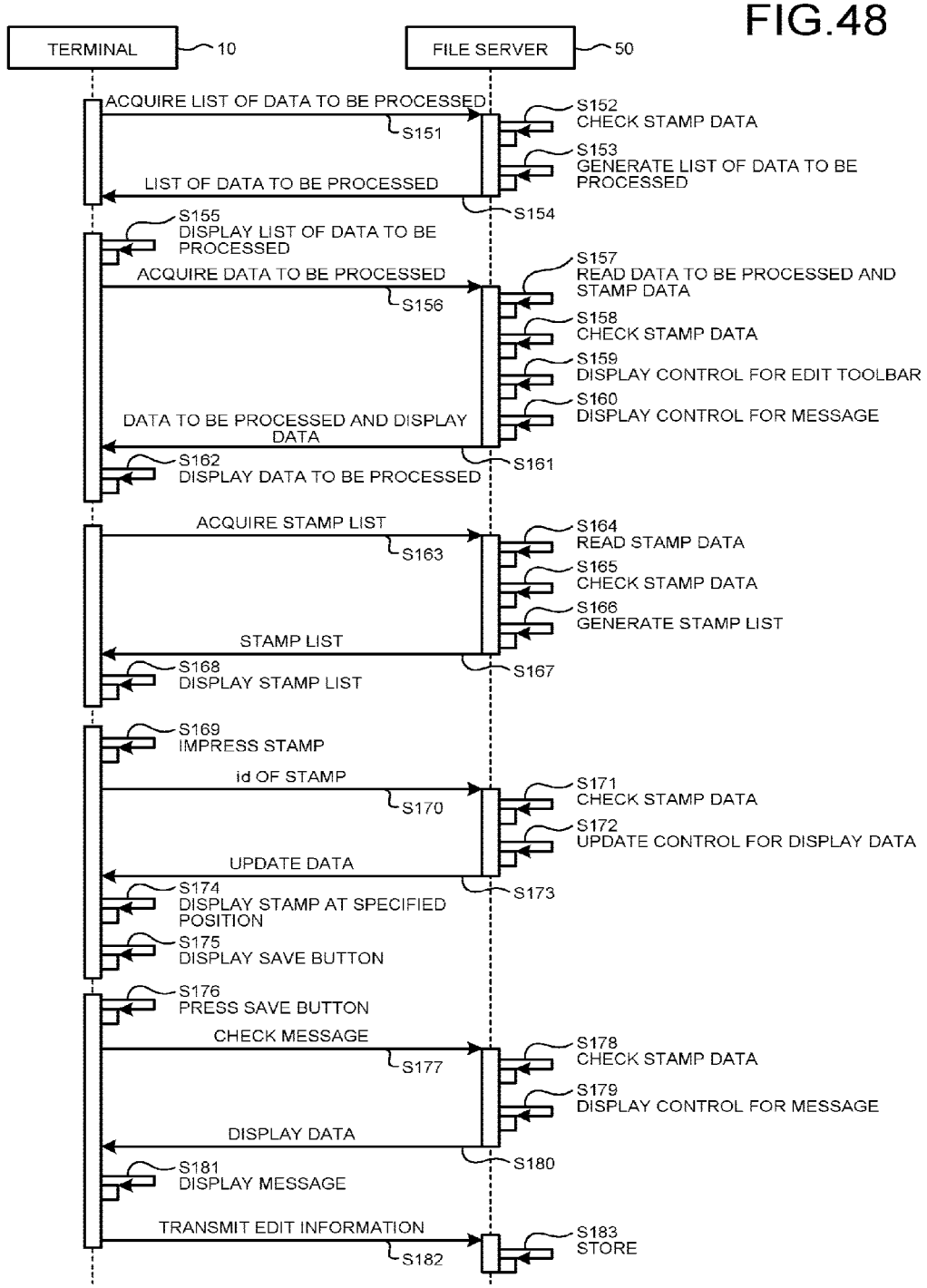
FIG. 48 is a sequence diagram of an example of a control method according to the second embodiment (second aspect)

FIG. 48 is a sequence diagram of an example of the control method according to the second aspect. In the example illustrated in FIG. 48, the relay server 30 is not illustrated because the relay server 30 performs no processing other than relaying the communications between the terminal 10 and the file server 50.

Explanation of the processing from Step S151 to Step S155 is the same as the processing from Step S111 to Step S115 according to the first aspect (refer to FIG. 38) and is therefore omitted.

If the input unit 15 of the terminal 10 receives a pressing of a select button when data to be processed is selected from a list of data to be processed, the communication unit 12 transmits a request to acquire the data to be processed to the file server 50 (Step S156).

If the communication unit 42 of the file server 50 receives the request transmitted at Step S156, the storage control unit 45 of the file server 50 reads, from the storage unit 41, the data to be processed specified by the request and stamp data of a stamp already impressed on the data to be processed (Step S157).

The control unit 44 of the file server 50 checks the stamp data read at Step S157 (Step S158).

The control unit 44 of the file server 50 performs control to display the edit toolbar (Step S159). Specifically, if "editable" of the stamp data associated with the stamp impressed on the data to be processed is not False, for example, the control unit 44 of the file server 50 determines to display the edit toolbar on the display unit 14 of the terminal 10. If no stamp is impressed on the data to be processed, for example, the control unit 44 of the file server 50 determines to display the edit toolbar on the display unit 14 of the terminal 10.

The control unit 44 of the file server 50 performs control to display a message to be displayed when the data to be processed is displayed (Step S160). Specifically, if "open_message" of the stamp data associated with the stamp impressed on the data to be processed includes a message, the control unit 44 of the file server 50 determines to display the message on the display unit 14 of the terminal 10.

The communication unit 42 of the file server 50 transmits the data to be processed and display data to the terminal 10 (Step S161). The data to be processed is data to be processed read from the storage unit 41 at Step S157. If a stamp is already impressed on the data to be processed, the display data includes an image indicating the stamp. If the edit toolbar is determined to be displayed at Step S159, the display data includes the edit toolbar. If a message is determined to be displayed at Step S160, the display data includes the message.

The display unit 14 of the terminal 10 displays the display screen of data to be processed on the basis of the data to be processed and the display data transmitted at Step S161 (Step S162).

If the input unit 15 of the terminal 10 receives a pressing of an acquire button in the window 204 (refer to FIG. 41), the communication unit 12 of the terminal 10 transmits a request to acquire a stamp list to the file server 50 (Step S163).

If the communication unit 42 of the file server 50 receives the request transmitted at Step S163, the storage control unit 45 of the file server 50 reads stamp data from the storage unit 41 (Step S164).

The control unit 44 of the file server 50 checks the stamp data (Step S165). Specifically, the control unit 44 of the file server 50 checks whether there is a stamp identified by id included in "available_stamp" of the stamp data of the stamp already impressed on the data to be processed.

The control unit 44 of the file server 50 generates a stamp list to be displayed in the window 204 after the acquire button in the window 204 is pressed (Step S166). Specifically, the control unit 44 of the file server 50 generates the stamp list based on stamps identified by id included in "available_stamp" of the stamp data of the stamp already impressed on the data to be processed.

The communication unit 42 of the file server 50 transmits the stamp list generated at Step S166 to the terminal 10 (Step S167).

The display unit 14 of the terminal 10 displays the stamp selection screen including the stamp list transmitted at Step S167 (Step S168). The input unit 15 of the terminal 10 receives input of impressing a stamp at a specified position on the data to be processed (Step S169).

The communication unit 12 of the terminal 10 transmits id of the stamp impressed on the data to be processed to the file server 50 (Step S170).

If the communication unit 42 of the file server 50 receives id of the stamp transmitted at Step S170, the control unit 44 of the file server 50 checks the stamp data including id of the stamp (Step S171). Specifically, the control unit 44 of the file server 50 checks whether a stamp identified by id included in "exclusive_stamp" of the stamp data of the stamp impressed on the data to be processed at Step S169 is already impressed on data to be processed.

The control unit 44 of the file server 50 performs control to update the display data (Step S172). Specifically, the control unit 44 of the file server 50 determines to delete, from the data to be processed, a stamp identified by id included in "exclusive_stamp" of the stamp data of the stamp impressed on the data to be processed at Step S169 out of the stamps already impressed on the data to be processed. The control unit 44 of the file server 50 generates a stamp list including stamps identified by id included both in "available_stamp" of the stamp data of the stamp impressed on the data to be processed at Step S169 and in "available_stamp" of the stamp data of the stamp already impressed on the data to be processed.

The communication unit 42 of the file server 50 transmits the update data to the terminal 10 (Step S173). The update data includes id of the stamp to be deleted from the data to be processed and the updated stamp list.

The display unit 14 of the terminal 10 displays the stamp at the position specified by the input at Step S169 (Step S174). At this time, if the update data transmitted at Step S173 includes id of the stamp to be deleted from the data to be processed, the display unit 14 of the terminal 10 deletes the stamp identified by the id from the data to be processed.

If the input unit 15 of the terminal 10 receives a pressing of the acquire button in the window 204 (refer to FIG. 41) again, the display unit 14 of the terminal 10 displays the stamp list included in the update data transmitted at Step S173.

If a change is made by the impression of the stamp on the data to be processed, the display unit 14 of the terminal 10 displays the save button 1209 (refer to FIG. 43) (Step S175). The input unit 15 of the terminal 10 receives a pressing of the save button 1209 (Step S176). The communication unit 12 of the terminal 10 transmits, to the file server 50, a request to check whether there is a message to be displayed when the data to be processed is saved (Step S177).

If the communication unit 42 of the file server 50 receives the request transmitted at Step S177, the control unit 44 of the file server 50 checks the stamp data of the stamp impressed on the data to be processed (Step S178). Specifically, the control unit 44 of the file server 50 checks whether "save_message" of the stamp data associated with the stamp impressed on the data to be processed includes a message.

The control unit 44 of the file server 50 performs control to display a message to be displayed when the data to be processed is saved (Step S179). Specifically, if "save_message" of the stamp data associated with the stamp impressed on the data to be processed includes a message, the control unit 44 of the file server 50 determines to display the message on the display unit 14 of the terminal 10.

If there is a message to be displayed when the data to be processed is saved, the communication unit 42 of the file server 50 transmits display data including the message to the terminal 10 (Step S180).

If the communication unit 12 of the terminal 10 receives the display data transmitted at Step S180, the display unit 14 displays the message included in the display data (Step S181). The communication unit 12 of the terminal 10 transmits, to the file server 50, edit information on the data to be processed fixed by a pressing of the save button 1209 (Step S182).

If the communication unit 42 of the file server 50 receives the edit information, the storage control unit 45 of the file server 50 updates and saves the data to be processed in the storage unit 41 on the basis of the edit information (Step S183).

Figure 49:
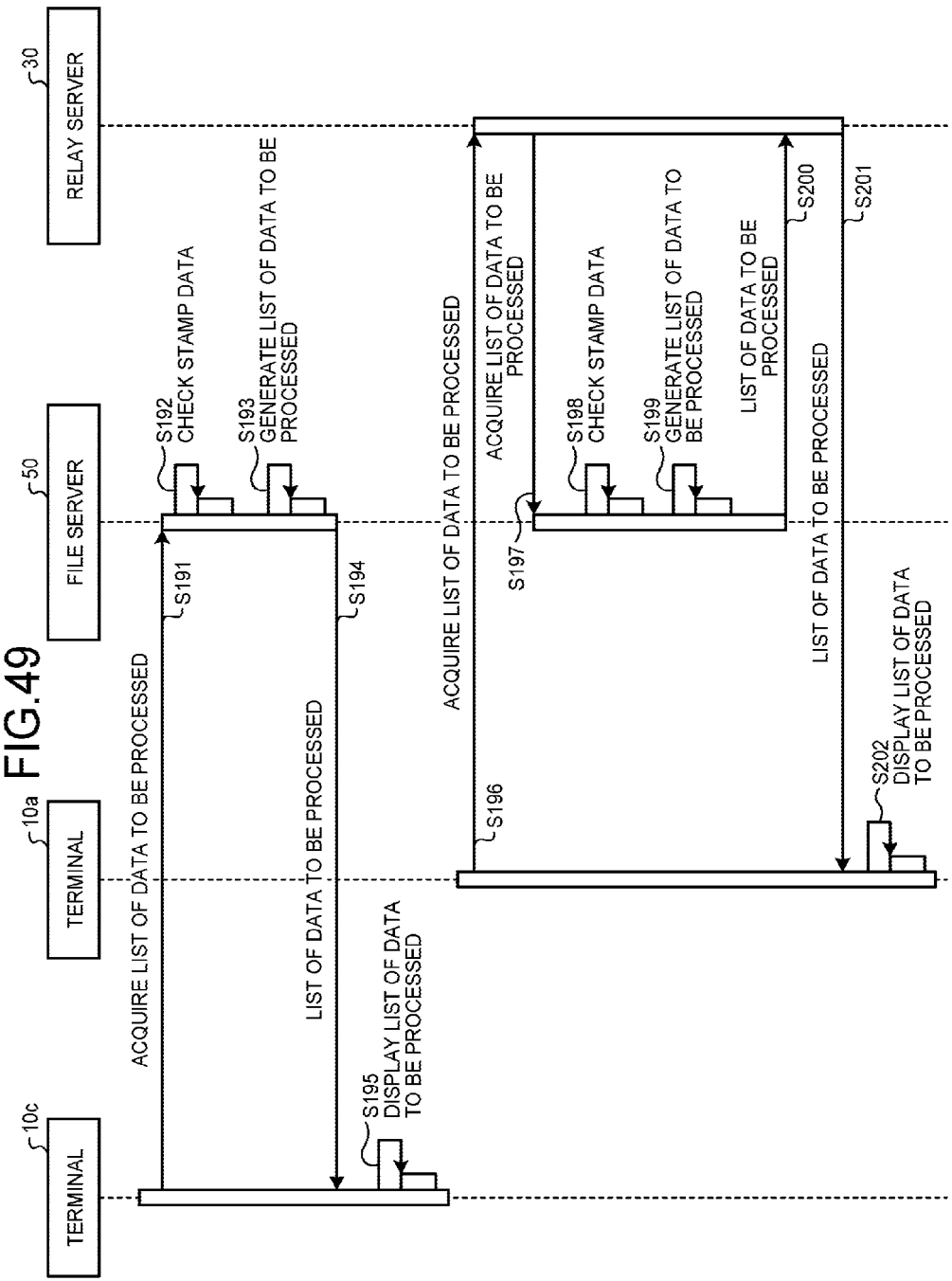
FIG. 49 is a sequence diagram of an example of a display control method for a list of data to be processed according to the second embodiment (second aspect)
Figure 50A:
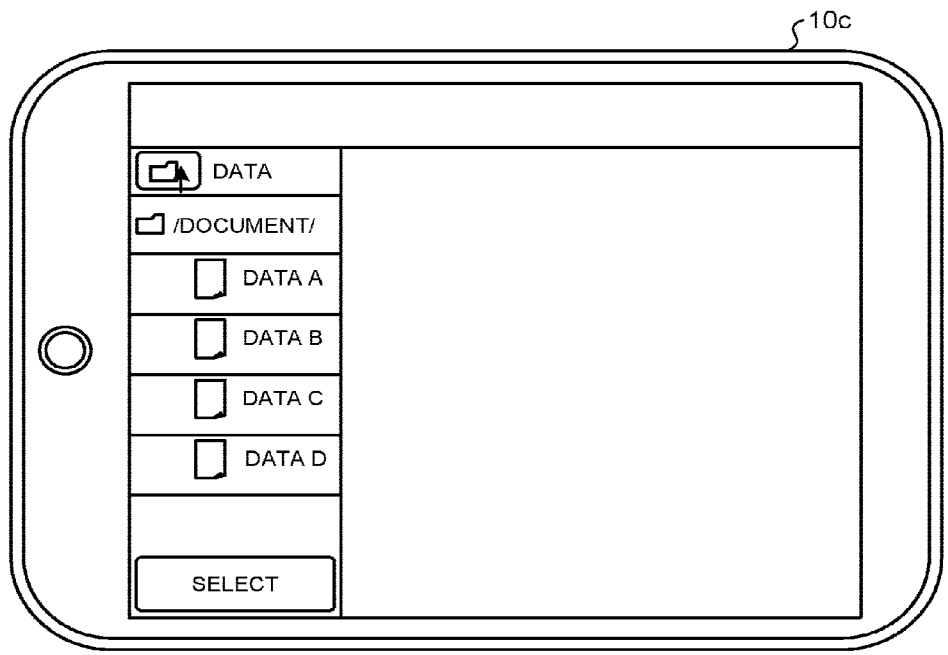
FIG. 50A is a diagram of a first display example of the list of data to be processed according to the second embodiment (second aspect)
Figure 50B:
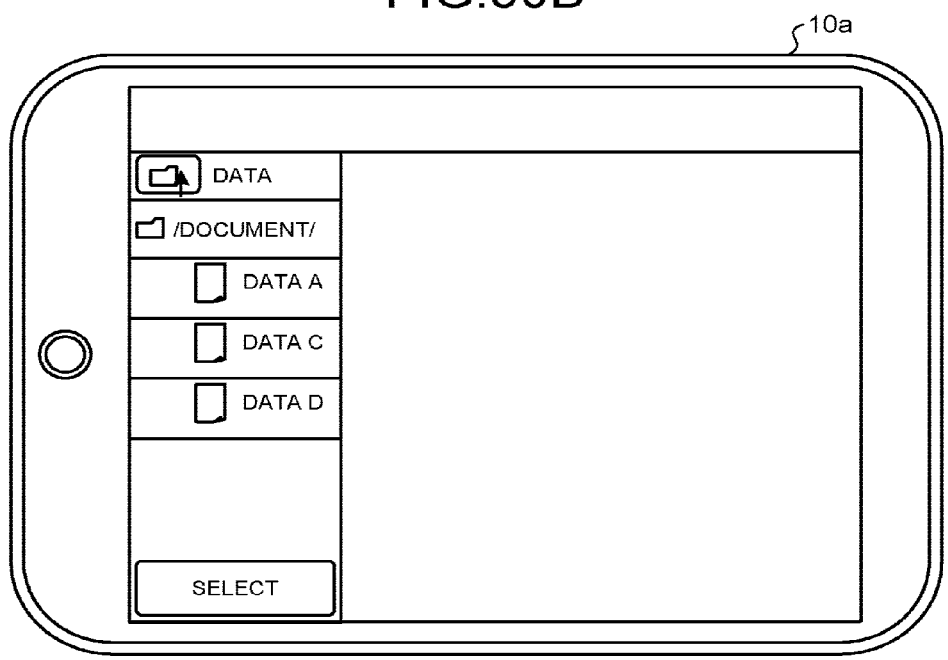
FIG. 50B is a diagram of a second display example of the list of data to be processed according to the second embodiment (second aspect).

The following supplementarily describes control processing on the basis of the set value of "access_by_remote" with reference to FIGS. 49, 50A, and 50B. In the example illustrated in FIGS. 49, 50A, and 50B, data A, data B, data C, and data D are stored in /document/ in the storage unit 41 of the file server 50, and data B is provided with a stamp associated with stamp data having "access_by_remote" set to False. The stamp associated with the stamp data having "access_by_remote" set to False is the for-internal-use-only stamp, for example.

FIG. 49 is a sequence diagram of an example of a display control method for a list of data to be processed according to the second aspect. The communication unit 12 of the terminal 10*c* connected to the second network 102 transmits, to the file server 50, a request to acquire a list of data to be processed to be displayed on the data selection screen (Step S191).

The control unit 44 of the file server 50 checks stamp data (refer to Table 2) of a stamp already impressed on the data to be processed stored in the storage unit 41 (Step S192).

The control unit 44 of the file server 50 generates information indicating the list of data to be processed on the basis of the stamp data (Step S193). The control unit 44 of the file server 50 enters the data B in the list of data to be processed because the terminal 10*c* serving as the source of the request transmitted at Step S191 is connected to the second network 102.

The communication unit 42 of the file server 50 transmits the information indicating the list of data to be processed to the terminal 10*c* (Step S194). The display unit 14 of the terminal 10*c* displays the selection screen of the data to be processed including the information indicating the list of the data to be processed (Step S195).

FIG. 50A is a diagram of a first display example of the list of data to be processed according to the second aspect. FIG. 50A illustrates a display example of the list of data to be processed displayed on the terminal 10*c* connected to the second network 102. While the data B is provided with a stamp associated with stamp data having "access_by_remote" set to False, the list of data to be processed displayed on the terminal 10*c* includes the data B.

Referring back to FIG. 49, the communication unit 12 of the terminal 10*a* connected to the first network 101 transmits, to the relay server 30, a request to acquire a list of data to be processed to be displayed on the data selection screen (Step S196).

The communication unit 32 (refer to FIG. 4) of the relay server 30 transmits the request transmitted at Step S196 to the file server 50 (Step S197). The communication unit 32 of the relay server 30 may transmit the request transmitted at Step S196 to the file server 50 at any timing. When receiving an inquiry about a request from the file server 50, for example, the communication unit 32 of the relay server 30 may transmit a request including identification information for identifying the file server 50 as a destination to the file server 50.

The control unit 44 of the file server 50 checks the stamp data (refer to Table 2) of the stamp already impressed on the data to be processed stored in the storage unit 41 (Step S198).

The control unit 44 of the file server 50 generates information indicating the list of data to be processed on the basis of the stamp data (Step S199). The control unit 44 of the file server 50 does not enter the data B in the list of data to be processed because the terminal 10a serving as the source of the request transmitted at Step S196 is connected to the first network 101.

The communication unit 42 of the file server 50 transmits the information indicating the list of data to be processed to the relay server 30 (Step S200). The communication unit 32 of the relay server 30 transmits the information indicating the list of data to be processed transmitted at Step S200 to the terminal 10a (Step S201).

The display unit 14 of the terminal 10a displays the selection screen of the data to be processed including the information indicating the list of data to be processed (Step S202).

FIG. 50B is a diagram of a second display example of the list of data to be processed according to the second aspect. FIG. 50B illustrates a display example of the list of data to be processed displayed on the terminal 10a connected to the first network 101. Because the data B is provided with a stamp associated with stamp data having "access_by_remote" set to False, the list of data to be processed displayed on the terminal 10a does not include the data B.

As described above, the communication unit 42 of the file server 50 in the information processing system 100 according to the second aspect receives, from the terminal 10, a request indicating processing to data to be processed. If a stamp is impressed on the data to be processed, the control unit 44 of the file server 50 controls processing to the data to be processed, on the basis of control data included in stamp data associated with the stamp. The information processing system 100 according to the second aspect thus can control processing to the data to be processed, on the basis of the stamp impressed on the data to be processed similarly to the first aspect.

The following describes an exemplary hardware configuration of the terminal 10, the relay server 30, and the file server 50 according to the first and the second aspects.

The hardware configuration according to the second embodiment is the same as illustrated in FIG. 33 except that a camera (not illustrated) is connected thereto via the bus 310. Explanation of the same hardware configuration is omitted. The camera is an image-capturing device that reads information, such as a two-dimensional code. The relay server 30 and the file server 50 do not necessarily include a camera. Furthermore, the terminal 10 does not necessarily include a camera if the terminal 10 can acquire information included in the two-dimensional code or the like by another system.

An embodiment can cause the image addition function and the workflow function to link.

Further, an embodiment can control processing to data, on the basis of an image added to the data.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:
1. An information processing system, comprising:
a terminal including a display and first processing circuitry; and
a file server including second processing circuitry, wherein
the first processing circuitry is configured to:
acquire first data from the file server;
control the display to display a first image of the first data;
add a second image, different from the first image, to the first image to create a third image;
control the display to display the third image; and transmit second data corresponding to the third image to the file server, and the second processing circuitry is configured to:

receive the second data; and execute a workflow processing to the first data, the workflow processing corresponding to the second image and the second processing circuitry executing the workflow processing according to the second image included in the third image corresponding to the second data.

2. The information processing system according to claim 1, wherein the second processing circuitry is further configured to set the workflow processing, associate the first image and the workflow processing, and transmit the first image to the terminal.

3. The information processing system according to claim 1, wherein the workflow processing includes, printing the first data by a printing device specified by the workflow processing.

4. The information processing system according to claim 1, wherein the workflow processing includes storing the first data in a storage location specified by the workflow processing.

5. The information processing system according to claim 1, wherein the workflow processing includes converting the first data to a data format specified by the workflow processing.

6. The information processing system according to claim 4, wherein the workflow processing includes deleting the first data from the storage location specified by the workflow processing if a period of time specified by the workflow processing has elapsed.

7. The information processing system according to claim 1, wherein the workflow processing includes faxing the first data to a destination specified by the workflow processing.

8. The information processing system according to claim 1, wherein the workflow processing includes notifying a destination specified by the workflow processing, of information indicating a result of execution of the workflow processing.

9. The information processing system according to claim 1, wherein the display is further configured to display a message in a chat performed via a chat server.

10. The information processing system according to claim 1, wherein the terminal is connected to a first network to which a relay server is connected, the file server is connected to a second network, and communication from the terminal to the file server is performed via the relay server.

11. The information processing system according to claim 1, wherein the second image comprises a stamp.

12. The information processing system according to claim 1, wherein the file server comprises a storage configured to store third data to be processed, one or more images, and control data associated with the one or more images and store, if a fourth image is added to the third data to be processed, the fourth image in association with the third data to be processed, and the first processing circuitry is further configured to:

receive the third data to be processed from the file server;

receive the fourth image and first control data associated with the fourth image if the fourth image is added to the third data to be processed;

control the display to display the third data to be processed and to further display the fourth image if the fourth image is added to the third data to be processed; and control processing to the third data to be processed, based on the first control data if the fourth image added to the third data to be processed.

13. The information processing system according to claim 12, wherein the first control data includes a first message to be displayed if the third data to be processed is displayed, and the first processing circuitry is configured to control the display to display the first message included in the first control data.

14. The information processing system according to claim 12, wherein the first control data includes information indicating whether the third data to be processed to which the fourth image is added is to be capable of being edited, and the first processing circuitry is configured to control the display to display the third data to be processed while enabling editing of the third data to be processed if the third data to be processed is added is to be capable of being edited, and control the display to display the third data to be processed while disabling editing of the third data to be processed if the third data to be processed is added is to be incapable of being edited.

15. The information processing system according to claim 12, wherein the first control data includes information indicating whether to permit the terminal to access the third data to be processed to which the fourth image is added, via the relay server, and the second processing circuitry is configured to control whether to permit the terminal to access the data, based on the first control data associated with the first image, when the terminal accesses the third data to be processed to which the fourth image is added, via the relay server.

16. The information processing system according to claim 12, wherein the first control data includes second identification information for identifying a fifth image capable of being added to the third data to be processed to which the fourth image is added, and the first processing circuitry is configured to receive input indicating an operation of adding the fifth image to the third data to be processed, and control the display to display the image identified by the second identification information included in the first control data as an image capable of being added to the third data to be processed, and control the display to display, if the input indicating the operation of adding the fifth image to the third data to be processed is received, the third data to be processed to which the fifth image is added.

17. The information processing system according to claim 16, wherein second control data associated with the fifth image includes first identification information for identifying the fourth image in an exclusive relationship with the third data to be processed to which the fifth image is added, and the first processing circuitry is configured to delete the fourth image in the exclusive relationship with the fifth image from the third data to be processed if the fifth image is added to the third data to be processed to which the fourth image is added.

18. The information processing system according to claim 17, wherein the second control data includes a second message to be displayed if the third data to be processed to which the fifth image is added is saved, and the first processing circuitry is further configured to receive input indicating an operation of saving the third data to be processed to which the fifth image is added, and control the display to display the second message included in the second control data if the third data to be processed to which the fifth image is added is saved.

19. An information processing method performed by a system including a terminal and a file server, the information processing method comprising:

acquiring, by first processing circuitry of the terminal, first data from the file server;

controlling, by the first processing circuitry, a display to display a first image of the first data;

adding, by the first processing circuitry, a second image, different from the first image, to the first image to create a third image;

controlling, by the first processing circuitry, the display to the display the third image;

transmitting, by the first processing circuitry, second data corresponding to the third image to the file server;

receiving, by second processing circuitry of the file server, the second data; and executing, by the second processing circuitry, a workflow processing to the first data, the workflow processing corresponding to the second image and the second processing circuitry executing the workflow processing according to the second image included in the third image corresponding to the second data.

* * * * *